US011687886B2

(12) United States Patent
Luo et al.

(10) Patent No.: US 11,687,886 B2
(45) Date of Patent: Jun. 27, 2023

(54) METHOD AND DEVICE FOR IDENTIFYING NUMBER OF BILLS AND MULTIPLE BILL AREAS IN IMAGE

(71) Applicant: Hangzhou Glority Software Limited, Hangzhou (CN)

(72) Inventors: Huan Luo, Hangzhou (CN); Qingsong Xu, Hangzhou (CN); Qing Li, Hangzhou (CN)

(73) Assignee: Hangzhou Glority Software Limited, Hangzhou (CN)

( * ) Notice: Subject to any disclaimer, the term of this patent is extended or adjusted under 35 U.S.C. 154(b) by 383 days.

(21) Appl. No.: 17/266,626

(22) PCT Filed: Jul. 31, 2020

(86) PCT No.: PCT/CN2020/106231
§ 371 (c)(1),
(2) Date: Feb. 8, 2021

(87) PCT Pub. No.: WO2021/023111
PCT Pub. Date: Feb. 11, 2021

(65) Prior Publication Data
US 2021/0216766 A1   Jul. 15, 2021

(30) Foreign Application Priority Data

Aug. 2, 2019   (CN) .......................... 201910713010.2
Aug. 2, 2019   (CN) .......................... 201910713021.0

(51) Int. Cl.
*G06Q 20/04*   (2012.01)
*G06Q 20/10*   (2012.01)
(Continued)

(52) U.S. Cl.
CPC ......... *G06Q 20/045* (2013.01); *G06Q 20/102* (2013.01); *G06V 10/457* (2022.01);
(Continued)

(58) Field of Classification Search
CPC .. G06Q 20/045; G06Q 20/047; G06Q 20/102; G06V 30/413; G06V 30/416; G06V 30/19173; G06V 10/82; G06V 10/457
See application file for complete search history.

(56) References Cited

U.S. PATENT DOCUMENTS

2017/0213346 A1   7/2017   Kawamoto
2020/0372249 A1*  11/2020  Iwamura ................ G06Q 40/12

FOREIGN PATENT DOCUMENTS

CN   106203433    12/2016
CN   107016363    8/2017
(Continued)

OTHER PUBLICATIONS

Computer English Translation of Chinese Patent No. CN 107016363 A, pp. 1-12. (Year: 2017).*

(Continued)

*Primary Examiner* — Daniel G Mariam
(74) *Attorney, Agent, or Firm* — JCIP Global Inc.

(57) ABSTRACT

The invention provides a method and a device for identifying the number of bills and multiple bill areas in an image. The method comprises the following steps: acquiring the image containing a plurality of bills arranged in sequence; processing the image to obtain a plurality of boundary lines of each bill in the image; wherein the boundary lines comprise a first type of boundary lines which are substantially perpendicular to the bill arrangement direction; generating a long line segment which is substantially parallel to the arrangement direction of the bills and passes through the area where all the bills are located, wherein the long line segment has an intersection point with each first type of boundary line; and determining the number of bills in the image according to the lengths of the sub-line segments between the adjacent intersection points.

23 Claims, 8 Drawing Sheets

(51) Int. Cl.
*G06V 30/416* (2022.01)
*G06V 30/413* (2022.01)
*G06V 30/19* (2022.01)
*G06V 10/82* (2022.01)
*G06V 10/44* (2022.01)

(52) U.S. Cl.
CPC ........ *G06V 10/82* (2022.01); *G06V 30/19173* (2022.01); *G06V 30/413* (2022.01); *G06V 30/416* (2022.01)

(56) References Cited

FOREIGN PATENT DOCUMENTS

| CN | 109740548 | 5/2019 |
|----|-----------|--------|
| CN | 110427932 | 11/2019 |
| CN | 110428414 | 11/2019 |
| CN | 111275139 | 6/2020 |

OTHER PUBLICATIONS

"International Search Report (Form PCT/ISA/210) of PCT/CN2020/106231," dated Nov. 4, 2020, pp. 1-4.

* cited by examiner

METHOD AND DEVICE FOR IDENTIFYING NUMBER OF BILLS AND MULTIPLE BILL AREAS IN IMAGE

CROSS-REFERENCE TO RELATED APPLICATION

This application is a 371 of international application of PCT application serial no. PCT/CN2020/106231, filed on Jul. 31, 2020, which claims the priority benefit of China application no. 201910713021.0, filed on Aug. 2, 2019, and China application no. 201910713010.2, filed on Aug. 2, 2019. The entirety of each of the above mentioned patent applications is hereby incorporated by reference herein and made a part of this specification.

BACKGROUND

Field of the Disclosure

The invention relates to the field of artificial intelligence technology, in particular to a method and device for identifying the number of bills in an image, an electronic apparatus, and a computer-readable storage medium, as well as a method and device for identifying multiple bill areas in an image, an electronic apparatus, and a computer-readable storage medium.

Description of Related Art

With the continuous growth of the economy, people's consumption abilities continue to improve as well. In order to protect people's consumption rights, bills now serve as rightful protection for consumers as well as effective payment voucher. Therefore, financial personnel need to deal with a large number of bills every day. At the same time, there are an increasing number of people use accounting and classification statistics to keep a record of their consumption habits. Although artificial intelligence can be utilized to automatically identify the relevant information in the bill, the existing technology can only identify the information of one bill at a time. When there are many bills, in order to save time and effort, users tend to collect an image containing multiple bills. However, how to identify the number of bills in the image is an urgent issue to be solved.

SUMMARY OF THE DISCLOSURE

The purpose of the present invention is to provide a method and device for identifying the number of bills and multiple bill areas in an image, an electronic apparatus, and a computer-readable storage medium to solve the problem in the related art, that is, currently the number of bills in an image cannot be identified and multiple bills cannot be identified simultaneously. Specifically, the technical solution is as follows.

In the first aspect, the present invention provides a method for identifying the number of bills in an image, the method including:

The image containing multiple bills arranged in sequence is acquired.

The image is processed to obtain multiple boundary lines of each of the bills in the image, and the boundary lines include a first type of boundary lines which are substantially perpendicular to the bill arrangement direction.

A long line segment which is substantially parallel to the bill arrangement direction and passes through the area where all the bills are located is generated, and the long line segment has an intersection point with each first type of boundary line.

The number of bills in the image is determined according to the lengths of the sub-line segments between each of the adjacent intersection points.

In the second aspect, the present invention further provides a device for identifying the number of bills in an image, the device including:

An acquiring module is configured to acquire an image containing multiple bills arranged in sequence.

An obtaining module is configured to process the image to obtain multiple boundary lines of each bill in the image, and the boundary lines include a first type of boundary lines which are substantially perpendicular to the bill arrangement direction.

A generating module is configured to generate a long line segment which is substantially parallel to the bill arrangement direction and passes through the area where all the bills are located, and the long line segment has an intersection point with each first type of boundary line.

A determining module is configured to determine the number of bills in the image according to the lengths of the sub-line segments between each of the adjacent intersection points.

In the third aspect, the present invention further provides an electronic apparatus, including a processor, a communication interface, a memory, and a communication bus. Specifically, the processor, the communication interface, and the memory complete the communication with each other through the communication bus.

The memory is configured to store the computer program.

The processor is configured to implement the method for identifying the number of bills in an image as described in the first aspect when executing the computer program stored in the memory.

In the fourth aspect, the present invention further provides a computer-readable storage medium in which a computer program is stored, and the computer program implements the method for identifying the number of bills in the image as described in the first aspect when being executed by the processor.

On the other hand, the present invention provides a method for identifying multiple bill areas in an image, the method including:

An image containing multiple bills is acquired.

An approximate area of each bill in the image is identified through a machine vision algorithm.

For each bill, the approximate area of the bill in the image is processed to obtain multiple reference boundary lines in the approximate area, and an actual area of the bill is determined according to the multiple reference boundary lines.

Still on the other hand, the present invention further provides a device for identifying multiple bill areas in an image, the device including:

An acquiring module is configured to acquire an image containing multiple bills.

A first identifying module is configured to identify an approximate area of each bill in the image through a machine vision algorithm.

A determining module is configured to, for each bill, process the approximate area of the bill in the image to obtain multiple reference boundary lines in the approximate area, and determine an actual area of the bill according to the multiple reference boundary lines.

Additionally, the present invention further provides an electronic apparatus, including a processor, a communication interface, a memory, and a communication bus. Specifically, the processor, the communication interface, and the memory complete the communication with each other through the communication bus.

The memory is configured to store computer programs.

The processor is configured to implement the method for identifying multiple bill areas in an image as described above when executing the computer program stored in the memory.

In the meantime, the present invention further provides a computer-readable storage medium in which a computer program is stored, and the computer program implements the method for identifying multiple bill areas in the image when being executed by the processor.

Compared with the related art, the method and device for identifying the number of bills and multiple bill areas in an image, the electronic apparatus, and the computer-readable storage medium provided by the present invention have the following advantageous effects:

The image containing multiple bills arranged in sequence is acquired; the image is processed to obtain multiple boundary lines of each bill in the image; wherein the boundary lines include a first type of boundary lines which are substantially perpendicular to the bill arrangement direction; a long line segment which is substantially parallel to the bill arrangement direction and passes through the area where all the bills are located is generated, wherein the long line segment has an intersection point with each first type of boundary line; the number of bills in the image is determined according to the lengths of the sub-line segments between each of the adjacent intersection points. By applying the solution provided by the invention, it is possible to solve the problem of the related art, that is, the number of bills in the image cannot be identified.

By acquiring an image containing multiple bills, firstly the approximate area of each bill in the image is identified, and then for each bill, edge detection processing is performed on the approximate area of the bill to obtain multiple reference boundary lines in the approximate area of the bill. The actual area of the bill is then determined according to multiple reference boundary lines, and bill identification is performed on the actual area of each bill. Since the present invention can process an image containing multiple bills, there is no need to separately collect images of each bill for identification, such that it is possible to process multiple bills simultaneously, which increases bill identification speed and reduces workload of the bill processing personnel.

BRIEF DESCRIPTION OF THE DRAWINGS

In order to explain the embodiments of the present invention or the technical solutions in the prior art more clearly, the following will briefly introduce the drawings that need to be used in the description of the embodiments or the related art. Obviously, the drawings in the following description are only some embodiments of the present invention. For those of ordinary skill in the art, other drawings can be derived based on these drawings without inventive effort.

DESCRIPTION OF EMBODIMENTS

Figure 1:
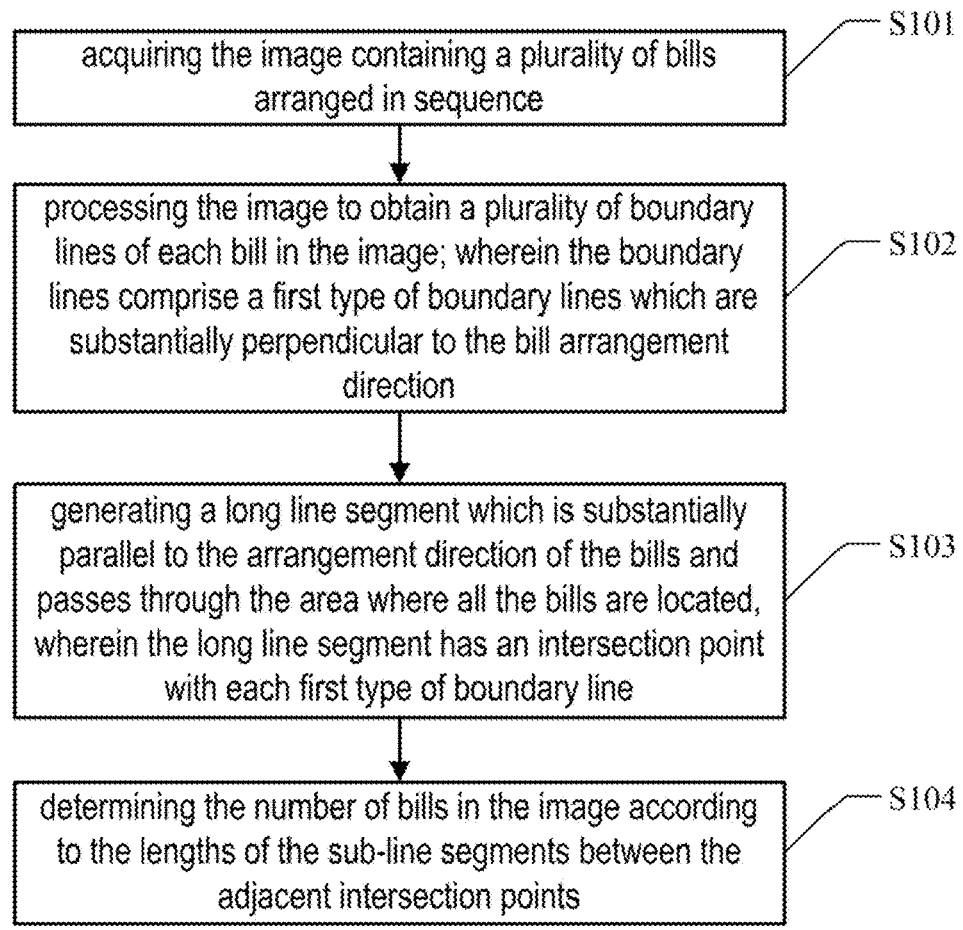
FIG. 1 is a schematic flowchart of a method for identifying the number of bills in an image according to an embodiment of the present invention.

The method and device for identifying the number of bills in an image, the electronic apparatus and computer-readable storage medium, and the method and device for identifying multiple bill areas in the image, the electronic apparatus, and the computer-readable storage medium provided in the invention are described in details with reference to the drawings and specific embodiments. Based on the following description and claims, the advantages and features of the present invention will be clearer. It should be noted that the drawings are illustrated in a very simplified manner and imprecise proportions, only serve to conveniently and clearly assist in explaining the purpose of the embodiments of the present invention. In addition, it should be noted that each block in the block diagram and/or flowchart herein, as well as the combination of the blocks in the block diagram and/or flowchart, can be implemented by using the hardware-based system configured to execute the prescribed function or action, or can be implemented by using the combination of specific hardware and computer program instructions. It is known to those skilled in the art that implementation through hardware, implementation through software, and implementation through a combination of software and hardware are all equivalent.

In order to make the purpose, features and advantages of the present invention more obvious and understandable, please refer to FIG. 1 to FIG. 12. It should be noted that the structure, ratio, size, etc. shown in the accompanying drawings in this specification only serve to exemplify the content disclosed in the specification for easy understanding and reading of those in the art, and are not intended to limit the implementation of the present invention, and thus have no substantial technical significance. Any structural modification, change of proportional relationship or adjustment of size should still fall within the scope of the present invention without affecting the effects and purpose that the present invention can produce.

In order to solve the problems of the related art, the embodiments of the present invention provide a method and device for identifying the number of bills in an image, an electronic apparatus and a computer-readable storage medium, as well as a method and device for identifying multiple bill areas in an image, an electronic apparatus, and a computer-readable storage medium.

It should be noted that the method for identifying the number of bills and multiple bill areas in an image according to an embodiment of the present invention can be applied to a device for identifying the number of bills in an image in an embodiment of the present invention, and the device for identifying the number of bills in an image may be configured on an electronic apparatus. Specifically, the electronic apparatus may be a personal computer, a mobile terminal, etc., and the mobile terminal may be a hardware device with various operating systems, such as a mobile phone or a tablet computer.

Embodiment 1

FIG. 1 is a schematic flowchart of a method for identifying the number of bills in an image according to an embodiment of the present invention. Please refer to FIG. 1. A method for identifying the number of bills in an image may include the following steps:

Step S101: An image containing multiple bills arranged in sequence is acquired.

The image is a photographed picture showing multiple bills arranged together, and the multiple bills are arranged in sequence without overlapping each other, and may be arranged sequentially in a single row or in multiple rows. The types of bills can be: invoices, bills, tax bills, receipts, shopping lists, catering receipts, insurance policies, reimbursement forms, express orders, itineraries, tickets and other documents containing the payment amount. The multiple bills may be of the same type or different types, the embodiment provides no limitation thereto.

Step S102: The image is processed to obtain multiple boundary lines of each bill in the image; wherein the boundary lines include the first type of boundary lines which are substantially perpendicular to the bill arrangement direction.

In this embodiment, the edge detection method can be performed on the image to find the boundary line of each bill. Specifically, the detailed steps of using the edge detection algorithm to find the boundary line will be described later.

The edge detection algorithm can be utilized to find the boundary lines in the upper, lower, left, and right directions of each bill. There may be one or more boundary lines in each direction. If the bills are arranged in a left-right direction, the bill arrangement direction is a direction along the left-right extending direction of the bills. On basis of the above, the boundary lines in the left-right direction of the bills are substantially perpendicular to the bill arrangement direction, and the boundary lines in the up-down direction are substantially parallel to the bill arrangement direction. It should be noted that since the user may arrange the bills at a slightly inclined angle, the boundary lines in the left-right direction of the bills may not be exactly perpendicular to the bill arrangement direction, and the boundary lines in the up-down direction will not be exactly parallel to the bill arrangement direction. In this embodiment, the boundary lines substantially perpendicular to the bill arrangement direction are called the first type of boundary lines, and the boundary lines substantially parallel to the bill arrangement direction are called the second type of boundary lines.

Step S103: A long line segment which is substantially parallel to the bill arrangement direction and passes through the area where all the bills are located is generated, wherein the long line segment has an intersection point with each first type of boundary line.

In this embodiment, the bills are arranged in the left-right direction, that is, a long line segment extending along the left-right direction of the bill is generated. The long line segment is substantially parallel to the bill arrangement direction, and the long line segment passes through the area where all bills are located, so that the long line segment has an intersection point with each boundary line in the left-right direction of each bill.

In other embodiments, the multiple bills in the image may be arranged in multiple rows in sequence, for example, there are upper and lower rows of bills arranged in sequence. Under the circumstances, for each row of bills, a long line segment which is substantially parallel to the bill arrangement direction corresponding to the row of bills and passes through the area where all bills are located is generated. In subsequent processing, each row of bills is processed separately to obtain the number of bills in each row, and then the number of bills in the entire image is obtained by adding up the number of bills in each row.

Figure 2A:
FIG. 2A and FIG. 2B are examples of images containing bills arranged in sequence.
Figure 2B:
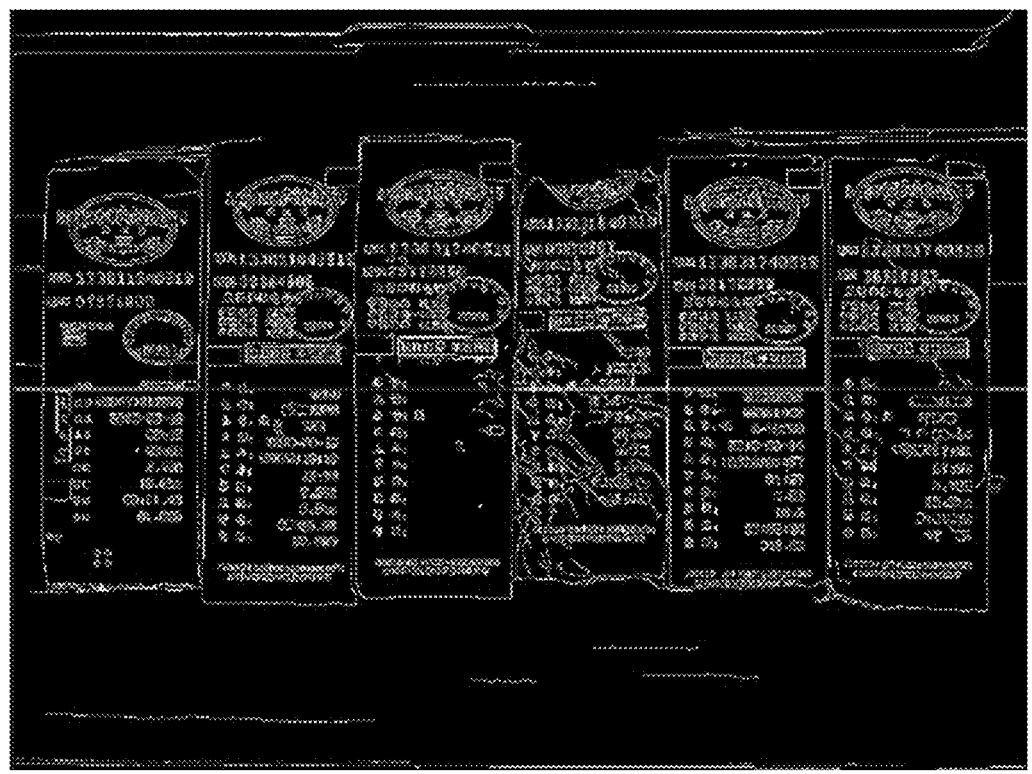

For example, in the image shown in FIG. 2A, the bills are sequentially arranged in a row from left to right, and the bills are arranged in a direction from left to right. In step S102, the image is processed by the edge detection algorithm. FIG. 2B shows the processed image. In the image shown in FIG. 2B, it can be seen that there are boundary lines in the upper, lower, left and right directions of each bill. In the image, the vertical boundary lines on the left and right sides of each bill are the first type of boundary lines. In step S103, a long line segment located in the middle of the image as shown in FIG. 2B is generated, and the long line segment is substantially parallel to the bill arrangement direction and intersects each first type of boundary line.

Step S104: The number of bills in the image is determined according to the length of the sub-line segment between each of the adjacent intersection points.

According to the sub-line segment formed between each of the adjacent intersection points, the length of each sub-line segment can be obtained. It can be understood that the length of the sub-line segment between the boundary lines on the left side and right side of each bill is approximately the width of the bill, and the length of the sub-line segment between the boundary line on the left side or right side of each bill is very short, while the length of the sub-line segment between the boundary line on the left side of one bill and the boundary line on the right side of the another bill among two adjacent bills is also short. Therefore, a bill area and a non-bill area can be distinguished according to the length of each sub-line segment, thereby determining the number of bills in the image.

Specifically, the number of bills in the image is determined according to the length of the sub-line segment between each of the adjacent intersection points, the step includes:

According to the length of the sub-line segments between each of the adjacent intersection points, at least one target sub-line segment among sub-line segments is determined in sequence according to the arrangement sequence of the intersection points, wherein each target sub-line segment is the longest sub-line segment among the multiple sub-line segments adjacent to the target sub-line segment.

The number of bills in the image is determined according to the number of determined target sub-line segments.

The width of each bill in the image may be the same or different. When the width of the bill is the same or similar, the lengths of the determined target sub-line segments are the same or similar. Therefore, the number of bills in the image can be determined according to the number of long line segments with the same or similar length, or the longest sub-line segment among the adjacent sub-line segments can be located to be determined as the target sub-line segment. Or, a length threshold is set, the lengths of all sub-line segments are acquired first, then the sub-line segment with a length greater than the threshold is determined as the target sub-line segment. When the width of the bill is different, the length of the target sub-line segment is different. Under the circumstances, the longest sub-line segment among the adjacent sub-line segments can be located to be determined as the target sub-line segment. Or, a length threshold is set, the lengths of all sub-line segments are acquired first, then the number of target sub-line segments with lengths greater than the length threshold are directly acquired, thereby determining the number of bills.

Figure 3:
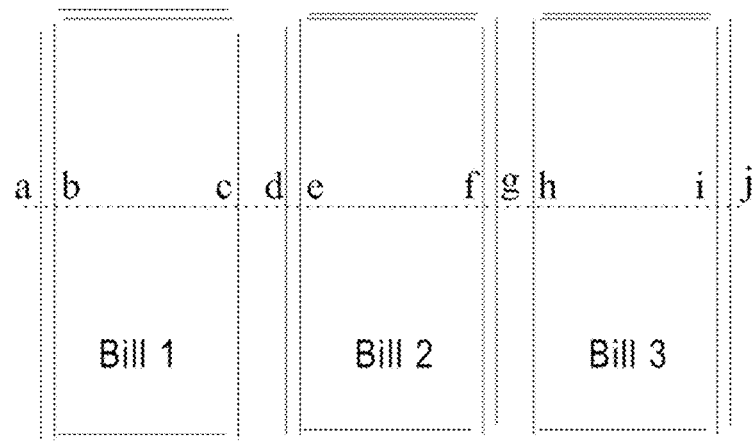
FIG. 3 is a schematic diagram of the image after edge detection processing.

The method of determining the target sub-line segment will be exemplified below with reference to the schematic diagram shown in FIG. 3. FIG. 3 is a schematic diagram which exemplifies the image after being subjected to edge detection processing. There are three bills in the figure, and the three bills are arranged from left to right. The figure only shows the boundary lines of each bill in the image. As shown in FIG. 3, each bill has one or two boundary lines in the upper, lower, left, and right directions, and the boundary lines in the left and right directions are the first type of boundary lines. The horizontal dashed line in the figure is the generated long line segment that passes through the area where all bills are located. The long line segment intersects each first type of boundary line. The intersection points are a, b, c, d, e, f, g, h, i, j in sequence. It can be seen from the figure that the sub-line segment bc is the longest among the sub-line segments adjacent to the sub-line segment bc, the sub-line segment ef is the longest among the sub-line segments adjacent to the sub-line segment ef, and the sub-line segment hi is the longest among the sub-line segments adjacent to the sub-line segment hi; therefore, the sub-line segments bc, ef, and hi are used as the target sub-line segments. Since the number of target sub-line segments is three, it can be determined that the number of bills in FIG. 3 is three. In addition, the length threshold of the target sub-line segment can also be set according to the size of the bill. For example, the width of the bill in FIG. 3 is approximately 250, and the length threshold is set to 200. Then, according to the lengths of the sub-line segments ab, bc, cd, de, ef, fg, gh, hi and ij in FIG. 3, the sub-line segments bc, ef and hi with a length longer than or equal to 200 are determined as the target sub-line segments.

It should be noted that in this embodiment, it is required that the distance between the various bills should not be too large, otherwise it will be misidentified that a bill exists in a blank space.

In practical applications, in addition to the above-mentioned case where the distance between bills is too large, there may be some long vertical lines (such as tables, etc.) in some bills, resulting in multiple long sub-line segments, and therefore one bill is misidentified as multiple bills. In such case, the second type of boundary line can be adopted for filtering to modify the target sub-line segment. Specifically, the method for determining the target sub-line segment may further include:

For two adjacent first boundary line areas, the target second type of boundary line between the two adjacent first boundary line areas is set to intersect the first type of boundary line between the two adjacent first boundary line areas, and the average length of the target second type of boundary line after intersection is acquired. If there are multiple sub-line segments between the two adjacent first boundary line areas and the sum of the lengths of the multiple sub-line segments is approximately equal to the average length of the target second type of boundary line after intersection, then the multiple sub-line segments are merged into a target sub-line segment.

In this embodiment, the area where at least one first type of boundary line on the left or right side of a bill is located is called the first boundary line area. It can be understood that there is one first boundary line area respectively located on the left and right sides of one bill, and the two first boundary line areas are adjacent to each other. If there is a second type of boundary line between two adjacent first boundary line areas, it means that the two adjacent first boundary line areas are the boundary line areas of the same bill; therefore, there should be a target sub-line segment between the two adjacent first boundary line areas. If there is no second type of boundary line between the two adjacent first boundary line areas, it means that the two adjacent first boundary line areas belong to the boundary line areas of two different bills; therefore, there is no target sub-line segment between the two adjacent first boundary line areas.

Based on the above, a second type of boundary line (the second type of boundary line serves as the target second type of boundary line) between two adjacent first boundary line areas is set to intersect the first type of boundary line in the two adjacent first boundary line areas, and the average length of the target second type of boundary lines after intersection is acquired; the average length can also be considered as the width of the bill. Then, if there are multiple sub-line segments between the two adjacent first boundary line areas and the sum of the lengths of the multiple sub-line segments is approximately equal to the average length (it can be considered that the target sub-line segment is divided into multiple sub-line segments by the longer vertical line in the bill), the multiple sub-line segments are merged into one target sub-line segment.

In practical applications, the method for identifying the number of bills in an image provided by the present invention can be applied to a client terminal, such as a client terminal of a mobile phone, so that an image can be acquired through the mobile phone. Because the resolution of images taken by mobile phones is relatively high, which increases the complexity of image transmission, it is preferable to reduce the resolution of the image for processing. In the meantime, in order to ensure that the image with reduced resolution is still relatively clear, it is necessary to select an appropriate reduction ratio according to the image.

Specifically, after determining the number of bills in the image, the first reduction ratio of the resolution of the image may be determined according to the number of bills, and then the resolution of the image is reduced according to the first reduction ratio.

It can be understood that for images with the same resolution, if the number of bills is small, the reduction ratio can be set to be slightly larger, so that the resolution can be reduced correspondingly, and the image with reduced resolution can still clearly show the content of bill. On the contrary, if the number of bills is large, the reduction ratio can be set to be a little smaller, because the resolution should be reduced less so as to avoid that the image with reduced resolution cannot clearly show the content of bill. Therefore, the reduction ratio corresponding to different bill quantities can be set in advance. For example, when the number of bill is 1, the first reduction ratio is 2; when the number of bill is 2, the first reduction ratio is 1.5; when the number of bill is 3, the first reduction ratio is 1.2, and so forth. It can be further set that the first reduction ratio is 0 when the number of bills exceeds a certain value, that is, the resolution is not reduced. When setting the reduction ratio, the original resolution of the image can be taken into consideration. If the original resolution is low, the reduction ratio can be reduced correspondingly on basis of the value of the aforementioned reduction ratio. For example, if the original resolution is less than a certain value, the value of the above reduction ratio is reduced by 80%, that is, the first reduction ratio is 1.6 when the number of bills is 1, the first reduction ratio is 1.2 when the number of bills is 2, and the first reduction ratio is 0.96 when the number of bills is 3, and so forth.

In addition, the second reduction ratio of the resolution may be determined according to the length of the target sub-line segment corresponding to the bill area, and the resolution of the bill area may be reduced according to the second reduction ratio.

It can be understood that the length of the target sub-line segment can serve as the approximate size of the bill. For images with the same resolution, if the size of the bill is large, the reduction ratio can be set to be slightly larger, so that the resolution can be reduced accordingly, and the image with reduced resolution can still clearly show the content of the bill. If the size of the bill is small, the reduction ratio can be set a little smaller, because the resolution should be reduced less so as to avoid that the image with reduced resolution cannot clearly show the content of bill. For image containing multiple bills and with different sizes, the reduction ratio of resolution can be determined according to the bill with the smallest size, so as to ensure that the image with reduced resolution can clearly show the content of the bill with the smallest size. For example, the second reduction ratio is 2 when the bill size is within the first size range, the second reduction ratio is 1.5 when the bill size is within the second size range, the second reduction ratio is 1.2 when the bill size is within the third size range, and so forth. Additionally, it can be further set that the second reduction ratio is 0 when the size exceeds a certain value, that is, the resolution is not reduced. When setting the reduction ratio, the original resolution of the image can also be taken into account. If the original resolution is low, the reduction ratio can be reduced correspondingly on basis of the value of the above reduction ratio. For example, if the original resolution is less than a certain value, the value of the above reduction ratio is reduced by 80%, that is, the second reduction ratio is 1.6 when the bill size is in the first size range, the first reduction ratio is 1.2 when the bill size is in the second size range, and the first reduction ratio is 0.96 when the bill size is in the third range, and so forth.

In a further optimization scheme, the number of bills and the length of the target sub-line segment can also be combined to determine the reduction ratio of the resolution. For example, if the number of bills is only one but the bill size is small, the resolution does not need to be reduced much. If the number of bill is one but the bill size is large, the resolution can be reduced more. For example, an approximate reduction ratio can be determined first based on the number of bills, then the approximate reduction ratio is adjusted within a range according to the length of the target sub-line segment. If the length of the target sub-line segment is shorter, the approximate reduction ratio can be reduced as appropriate; if the length of the target sub-line segment is longer, the approximate reduction ratio can be increased as appropriate. Or, a reduction ratio range is determined first according to the number of bills, then an appropriate reduction ratio value within this range is selected according to the length of the target sub-line segment. If the length of the target sub-line segment is shorter, a smaller reduction ratio within this range is selected; if the length of the target sub-line segment is longer, a larger reduction ratio within this range is selected.

In this embodiment, after the number of bills in the image is determined, the area of each bill can further be determined, and the bill identification model can be adopted for each bill area to identify the content of each bill.

Specifically, for each target sub-line segment, a bill area is determined according to the two first type of boundary lines that intersect the target sub-line segment and the second type of boundary line between the two first type of boundary lines, and the preset bill identification model is adopted to identify the bill content in the bill area.

It can be seen from the above description that each target sub-line segment is obtained by intersecting the long line segment with the first type of boundary lines on the left and right sides of each bill. Then the area between the target sub-line segments is the area where the bill is located. Accordingly, the bill area can be determined according to the area formed by the two first type of boundary lines intersecting the target sub-line segments and the second type of boundary line between the two first type of boundary lines. After the bill area is determined, for each bill area, the preset bill identification model can be adopted to identify the bill content in the bill area, such as identifying the payment amount of bill, billing time, name and location of the store that issues the bill, and other information. The preset bill identification model is a pre-trained neural network model, for example, a convolutional neural network model. Each bill area can also be cut and output as a single bill picture for safekeeping.

The method for finding the boundary line of the image by using the edge detection method in step S102 will be introduced below.

Figure 4:
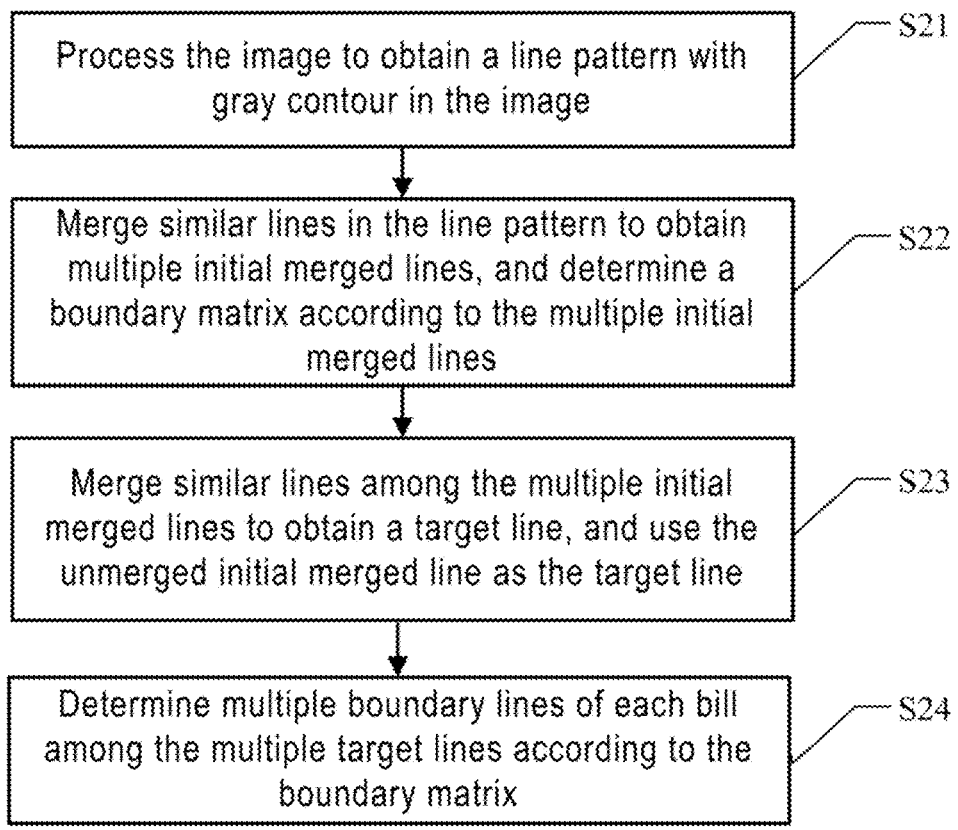
FIG. 4 is a schematic diagram of the process of step S102 in the identifying method shown in FIG. 1.

Specifically, as shown in FIG. 4, step S102 is performed to process the image to obtain multiple boundary lines of each bill in the image, which includes the following steps:

S21: The image is processed to obtain a line pattern with gray contour in the image.

S22: Similar lines in the line pattern are merged to obtain multiple initial merged lines, and a boundary matrix is determined according to the multiple initial merged lines.

S23: Similar lines among the multiple initial merged lines are merged to obtain a target line, and the unmerged initial merged lines are also used as the target line.

S24: Multiple boundary lines of each bill among the multiple target lines are determined according to the boundary matrix.

In step S21, the method of processing the image to obtain the line pattern with gray contour in the image may be as follows: the image is processed through an edge detection algorithm based on OpenCV to obtain the line pattern with gray contour in the image. OpenCV is an open source computer vision library. Edge detection algorithms based on OpenCV include Sobel, Scarry, Canny, Laplacian, Prewitt, Marr-Hildresh, scharr and many other algorithms. Specifically, the Canny edge detection algorithm is adopted in this embodiment. The Canny edge detection algorithm is a multi-stage algorithm that consists of multiple steps, including: 1. Image noise reduction: the image is smoothed by a Gaussian filter; 2. Image gradient calculation: a first-order partial derivative finite difference is adopted to calculate gradient amplitude and direction; 3. Non-maximum suppression: non-maximum suppression is performed on gradient amplitude; 4. Threshold filtering: a dual-threshold algorithm is adopted to detect and connect edges.

After processing by the above algorithm, a line pattern with gray contour in the image can be obtained. In the line pattern, each line is actually a very small line segment. Specifically, the boundary line of the bill in the image is actually divided into very small line segments, so it is necessary to connect similar lines and perform subsequent processing to obtain the boundary line of the bill. In practical applications, each small line segment in the line pattern is presented in the form of an array, and each line segment is composed of the coordinate values of the pixel points corresponding to the start and end points in the entire line pattern.

In step S22, the similar lines in the line pattern are merged in the following manner to obtain multiple initial merged lines. Step A: Long lines in the line pattern are acquired; wherein, the long lines are the lines whose lengths exceed the first preset threshold. Step B: Multiple groups of first type of lines are acquired from the long lines; wherein the first type of lines includes at least two long lines adjacent successively, and the angles between any two adjacent long lines are all smaller than the preset threshold. Step C: For each group of first type of lines, all the long lines in the group of first type of lines are merged in sequence to obtain an initial merged line.

In step A, the long line in the line pattern refers to a line whose length exceeds a certain threshold in the line pattern, for example, a line whose length exceeds two pixels is defined as a long line. Only the long lines in the line pattern are acquired for subsequent merging, and some shorter lines in the line pattern are not adopted. In this way, it is possible to avoid the interference of lines inside and outside the bill when merging the lines, such as lines corresponding to internal text, patterns and other external objects, etc.

For step B, the first type of line can be acquired in the following way. First, a long line is selected, and then starting from the long line in sequence, it is determined whether the angle between two adjacent lines is less than the second preset threshold. If it is determined that the angle between a long line and an adjacent line is not less than the second preset threshold, the selected long line and all the successively sequentially adjacent long lines are formed into a group of first type of lines, and then the above process is repeated. Starting from the line adjacent to the long line, it is sequentially determined whether the angle between two adjacent lines is less than the second preset threshold, and so forth, until all the long lines are checked, thereby obtaining multiple groups of first type of lines.

In step B, the angle between two lines is calculated based on the following formula: $\vec{a} \cdot \vec{b} = |\vec{a}||\vec{b}|\cos \theta$, wherein $\vec{a}$ and $\vec{b}$ respectively represent the vectors of two adjacent lines. Specifically, the value of the second preset threshold can be set according to actual conditions, for example, it can be set to merge the lines when the angle θ is less than 15 degrees.

In step C, merging two lines refers to taking the average of the slopes of the two lines, and this average is the slope of the merged line. In practical applications, the merging of two lines is calculated based on the array form of the two lines, so as to calculate the coordinate values of the pixel points corresponding to the start and end points of the merged line in the entire line pattern, and then the array of the merged line is formed according to the coordinate values obtained through calculation and stored.

In addition, the boundary matrix is determined in the following way. The multiple initial merged lines and the unmerged lines among the long lines are re-illustrated, and the position information of the pixel points in all the re-illustrated lines is set to correspond to the entire image matrix. The values of the positions of the pixel points of these lines in the image matrix are set as the first value, and the values of the positions of the pixel points other than these lines are set as the second value, thereby forming a boundary matrix. Specifically, the boundary matrix may be a matrix with the same size as the image matrix. For example, if the size of the image is 1024×1024 pixels, the image matrix is a 1024×1024 matrix, and the boundary matrix is also a 1024×1024 matrix. The multiple initial merged lines and the unmerged lines among the long lines are re-illustrated according to a certain line width (for example, the line width is 2), and the pixel points of the re-illustrated lines are set to correspond to the positions in the matrix, so that the value of the boundary matrix is filled. The positions of the pixel points on the lines corresponding to the matrix are set as the first value, such as 255, and the pixel points without lines corresponding to the position in the matrix are set as the second value, such as 0, thus forming the super big matrix of the whole picture, i.e., the boundary matrix. It should be noted that since the multiple initial merged lines and the unmerged lines among the long lines are stored in the form of arrays, they need to be formed as actual line data when determining the boundary matrix. Therefore, the lines are re-illustrated, for example, with a line width of 2, so as to obtain the coordinate values of the pixel point corresponding to each point on each line, and then the value in the boundary matrix is filled according to the obtained coordinate values. For example, the value of the position corresponding to the coordinate value in the boundary matrix is set to 255, and the value of the remaining positions is set to 0.

The following exemplifies a boundary matrix, the boundary matrix is a 10×10 matrix, where all positions with a value of 255 in the boundary matrix are connected to form multiple initial merged lines and unmerged lines among the long lines.

$$\begin{bmatrix} 0 & 0 & 0 & 0 & 0 & 0 & 0 & 0 & 0 & 0 \\ 0 & 255 & 255 & 255 & 255 & 255 & 255 & 255 & 255 & 0 \\ 0 & 255 & 0 & 0 & 0 & 0 & 0 & 255 & 255 & 0 \\ 0 & 0 & 255 & 0 & 0 & 0 & 255 & 0 & 255 & 0 \\ 0 & 255 & 0 & 0 & 0 & 255 & 0 & 0 & 255 & 0 \\ 0 & 255 & 0 & 0 & 255 & 0 & 0 & 0 & 255 & 0 \\ 0 & 255 & 0 & 255 & 255 & 255 & 255 & 255 & 255 & 0 \\ 0 & 255 & 255 & 0 & 0 & 0 & 0 & 0 & 255 & 0 \\ 0 & 255 & 255 & 255 & 255 & 255 & 255 & 255 & 255 & 0 \\ 0 & 0 & 0 & 0 & 0 & 0 & 0 & 0 & 0 & 0 \end{bmatrix}$$

In step S22, the initial merged line after the merge is multiple longer lines. In step S23, according to the merging rule in step S22, it can be continuously determined whether there are similar lines in the multiple initial merged lines, so that the similar lines are merged again to obtain multiple target lines, and the initial merged lines that cannot be merged are also used as the target line as well.

Specifically, the specific merging steps of merging similar lines among the multiple initial merged lines to obtain the target line are as follows. Step a: Multiple sets of second type of lines are acquired from the multiple initial merged lines; wherein the second type of line includes at least two initial merged lines adjacent successively, and all the angles between any two adjacent initial merged lines is less than the third preset threshold. Step b: For each group of second type of lines, the initial merged lines in the group of second type of lines are sequentially merged to obtain a target line.

The principle of the above step of merging the initial merged lines is the same as the principle of merging the lines in the line pattern in step S22, and related description can be derived from step S22, so no further description is narrated herein. Specifically, the third preset threshold may be the same as or different from the second preset threshold, the embodiment provides no limitation thereto, for example, the third preset threshold is set to an angle of 10 degrees.

So far, multiple target lines have been obtained. In the multiple target lines, there are not only boundary lines, but also some longer interference lines, such as the lines corresponding to internal text and patterns, other external objects, etc., that are longer lines obtained after merging process. These interference lines will be removed according to the boundary matrix in the subsequent step S24 to obtain the boundary lines of the bill area.

In step S24, multiple reference boundary lines among the multiple target lines are determined according to the boundary matrix, and the step includes: first, for each of the target lines, the target line is extended, and then a line matrix is determined according to the extended target line. Thereafter, the line matrix is compared with the boundary matrix, and the number of pixel points belonging to the boundary matrix on the extended target line is calculated to serve as the score of the target line, wherein the line matrix is the same size as the boundary matrix. Then, multiple boundary lines among the multiple target lines are determined according to the score of each target line.

Specifically, the line matrix can be determined in the following manner. The extended target line is re-illustrated, the position information of the pixel points in the re-illustrated line is set to correspond to the entire image matrix, and the value of the position of the pixel point of the line in the image matrix is set as the first value, and the value of the position of the pixel points other than the line is set as the second value, thereby forming a line matrix. The formation of the line matrix is similar to the boundary matrix, and will not be repeated here. It should be noted that the target line is stored in the form of an array, that is, the coordinate values of its start and end points are stored. After the target line is extended, the extended target line is stored in the form of array as the coordinate values of the start and end points of the extended target line. Therefore, when the extended target line is re-illustrated, it is re-illustrated according to the same line width, for example, the line width is 2, so as to obtain the coordinate values of the pixel points corresponding to each point on the extended target line, and the value of the line matrix is filled according to the coordinate value. That is, the value of the position corresponding to the coordinate value in the line matrix is set to 255, and the value of the remaining positions is set to 0.

The merged target line is extended, and the target line with the largest number of pixel points falling into the initial merged line and the unmerged lines among the long lines in step S22 is determined as the reference boundary line. Specifically, for each target line, it is determined how many pixel points belong to the boundary matrix, and a score is calculated. Specifically, the target line is extended, and the line obtained after the extension of target line is also formed into a line matrix in the same way as the boundary matrix is formed. Then, the line matrix is compared with the boundary matrix to determine how many pixel points fall into the boundary matrix, that is, it is determined how many pixel points in the same position in the two matrices have the same first value, such as 255, so as to calculate the scores. Under the condition, there may still be multiple lines with the best scores. Therefore, multiple target lines with the best scores among the multiple target lines are determined as reference boundary lines according to the score of each target line.

For example, the line matrix formed by an extended target line is as follows. By comparing the line matrix with the above boundary matrix, it can be seen that there are 7 pixel points on the extended target line falling into the boundary matrix, thereby obtaining the scores of the target line.

$$\begin{bmatrix} 0 & 255 & 0 & 0 & 0 & 0 & 0 & 0 & 0 & 0 \\ 0 & 255 & 0 & 0 & 0 & 0 & 0 & 0 & 0 & 0 \\ 0 & 255 & 0 & 0 & 0 & 0 & 0 & 0 & 0 & 0 \\ 0 & 255 & 0 & 0 & 0 & 0 & 0 & 0 & 0 & 0 \\ 0 & 255 & 0 & 0 & 0 & 0 & 0 & 0 & 0 & 0 \\ 0 & 255 & 0 & 0 & 0 & 0 & 0 & 0 & 0 & 0 \\ 0 & 255 & 0 & 0 & 0 & 0 & 0 & 0 & 0 & 0 \\ 0 & 255 & 0 & 0 & 0 & 0 & 0 & 0 & 0 & 0 \\ 0 & 255 & 0 & 0 & 0 & 0 & 0 & 0 & 0 & 0 \\ 0 & 255 & 0 & 0 & 0 & 0 & 0 & 0 & 0 & 0 \end{bmatrix}$$

In the end, the boundary lines in the upper, lower, left and right directions of each bill can be determined. There may be one or more boundary lines in each direction.

In summary, the method for identifying the number of bills in an image provided in this embodiment includes acquiring an image containing multiple bills arranged in sequence, and first processing the images to obtain multiple boundary lines of each bill in the image, and then generating a long line segment that is substantially parallel to the bill arrangement direction and passes through the area where all the bills are located. This long line segment has an intersection point with each first type of boundary line. The number of bills in the image can be determined according to the length of the sub-line segment between each adjacent intersection point. Since the present invention can identify the number of bills in the image, which facilitates subsequent identification of the contents of multiple bills, improves the bill identification speed, and reduces the workload of bill processing personnel.

Figure 5:
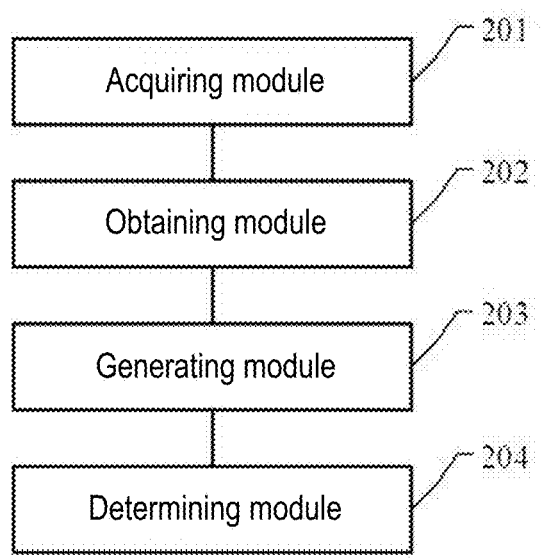
FIG. 5 is a schematic structural diagram of a device for identifying the number of bills in an image according to an embodiment of the present invention.

Corresponding to the embodiment of the above method, an embodiment of the present invention further provides a device for identifying the number of bills in an image. Please refer to FIG. 5. FIG. 5 is a schematic structural diagram of a device for identifying the number of bills in an image according to an embodiment of the present invention. A device for identifying the number of bills in an image may include:

An acquiring module 201 is configured to acquire an image containing multiple bills arranged in sequence.

An obtaining module 202 is configured to process the image to obtain multiple boundary lines of each bill in the image; wherein the boundary lines include the first type of boundary lines that are substantially perpendicular to the bill arrangement direction.

A generating module 203 is configured to generate a long line segment substantially parallel to the bill arrangement direction and passing through the area where all the bills are located, wherein the long line segment has an intersection point with each first type of boundary line.

A determining module 204 is configured to determine the number of bills in the image according to the length of the sub-line segments between each adjacent intersection point.

The device for identifying the number of bills in an image provided by the embodiment acquires an image containing multiple bills arranged in sequence, and first processes the image to obtain multiple boundary lines of each bill in the image, and then generates a long line segment that is substantially parallel to the bill arrangement direction and passes through the area where all bills are located. This long line segment has an intersection point with each first type of boundary line. The number of bills in the image can be determined according to the length of the sub-line segment between each adjacent intersection point. Since the present invention can identify the number of bills in the image, which facilitates subsequent identification of the contents of multiple bills, improves the bill identification speed, and reduces the workload of bill processing personnel.

Optionally, the determining module 204 determines the number of bills in the image according to the length of the sub-line segments between adjacent intersection points, which may include:

According to the length of the sub-line segment between each adjacent intersection point, at least one target sub-line segment among sub-line segments is sequentially determined according to the arrangement sequence of the intersection points, wherein each target sub-line segment is the longest sub-line segment among the multiple sub-line segments adjacent to the target sub-line segment.

The number of bills in the image is determined according to the number of determined target sub-line segments.

Optionally, after the determining module 204 determines the number of bills in the image, it may also be configured to:

Determine the first reduction ratio of the resolution of the image according to the number of the bills;

Reduce the resolution of the image according to the first reduction ratio.

Optionally, the determining module 204 may further be configured to:

Determine a second reduction ratio of resolution according to the length of the target sub-line segment;

Reduce the resolution of the image according to the second reduction ratio.

Optionally, the multiple bills in the image may be arranged sequentially in a single row.

Optionally, the multiple bills in the image may be arranged in multiple rows.

For each row of bills, the generating module 203 generates a long line segment parallel to the bill arrangement direction corresponding to the row of bills and passing through the area where all bills of the row are located.

Optionally, the device for identifying the number of bills in the image may further include:

An identifying module is configured for determining a bill area for each target sub-line segment according to the two first type of boundary lines intersecting the target sub-line segment and the second type of boundary line between the two first type of boundary lines. Moreover, a preset bill identification model is adopted to identify bill content in the bill area, wherein the second type of boundary line is a boundary line substantially parallel to the bill arrangement direction.

Optionally, the obtaining module 202 may include:

A sub-obtaining module is configured to process the image to obtain a line pattern with gray contour in the image.

A first sub-merging module is configured to merge similar lines in the line pattern to obtain multiple initial merged lines, and determine a boundary matrix according to the multiple initial merged lines.

A second sub-merging module is configured to merge similar lines among the multiple initial merged lines to obtain a target line, and the unmerged initial merged line is also adopted as the target line.

A sub-determining module is configured to determine multiple boundary lines of each bill among the multiple target lines according to the boundary matrix.

Optionally, the sub-obtaining module processes the image to obtain a line pattern with gray contour in the image, which may include:

The image is processed by an edge detection algorithm based on OpenCV to obtain a line pattern with gray contour in the image.

Optionally, the first sub-merging module merges similar lines in the line pattern to obtain multiple initial merged lines, which may specifically be as follows:

A long line in the line pattern is acquired; wherein the long line is a line whose length exceeds a first preset threshold.

Multiple groups of first type of lines are acquired from the long lines; wherein the first type of lines include at least two successively adjacent long lines, and the angles between any two adjacent long lines are all smaller than the second preset threshold.

For each group of first type of lines, the long lines in the group of first type of lines are sequentially merged to obtain an initial merged line.

Optionally, the second sub-merging module merges similar lines among the multiple initial merged lines to obtain a target line, which may specifically be as follows:

Multiple groups of second type of lines are acquired from the multiple initial merged lines; wherein the second type of lines includes at least two successively adjacent initial merged lines, and the angles between any two adjacent initial merged lines are all smaller than the third preset threshold.

For each group of second type of lines, the initial merged lines in the group of second type of lines are sequentially merged to obtain a target line.

Optionally, the boundary matrix may be determined in the following manner: The multiple initial merged lines and the unmerged lines among the long lines are re-illustrated, and the position information of the pixel points in all the re-illustrated lines is set to correspond to the entire image matrix. The values of the positions of the pixel points of these lines in the image matrix are set as the first value, and the values of the positions of the pixel points other than these lines are set as the second value, thereby forming a boundary matrix.

Optionally, the sub-determining module determines multiple boundary lines of each bill among the multiple target lines according to the boundary matrix, which may specifically be as follows:

First, for each of the target lines, the target line is extended, and then a line matrix is determined according to the extended target line. Thereafter, the line matrix is compared with the boundary matrix, and the number of pixel points belonging to the boundary matrix on the extended target line is calculated to serve as the score of the target line, wherein the line matrix is the same size as the boundary matrix.

Multiple boundary lines among the multiple target lines are determined according to the score of each target line.

Optionally, the line matrix may be determined according to the following manner: The extended target line is re-illustrated, the position information of the pixel points in the re-illustrated line is set to correspond to the entire image matrix, and the value of the position of the pixel point of the line in the image matrix is set as the first value, and the value of the position of the pixel points other than the line is set as the second value, thereby forming a line matrix.

Figure 6:
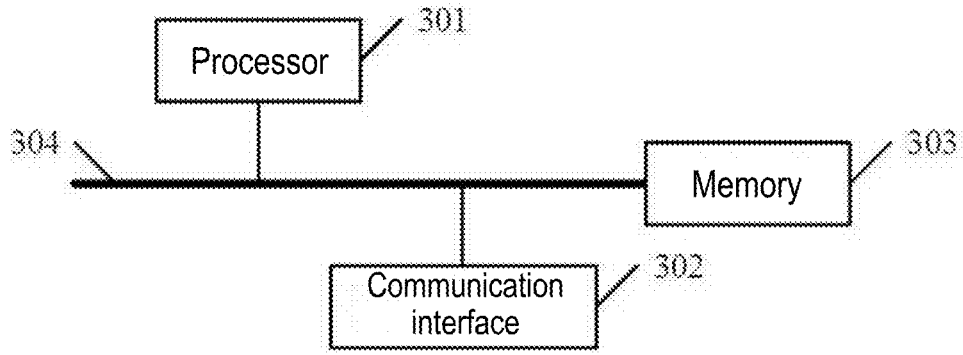
FIG. 6 is a schematic structural diagram of an electronic apparatus according to an embodiment of the present invention.

An embodiment of the present invention further provides an electronic apparatus. FIG. 6 is a schematic structural diagram of an electronic apparatus according to an embodiment of the present invention. Please refer to FIG. 6, an electronic apparatus includes a processor 301, a communication interface 302, a memory 303, and a communication bus 304, wherein the processor 301, the communication interface 302, and the memory 303 complete communication with each other through the communication bus 304.

The memory 303 is configured to store the computer program.

The processor 301 is configured to implement the following steps when executing the program stored in the memory 303:

The image containing multiple bills arranged in sequence are acquired;

The image is processed to obtain multiple boundary lines of each bill in the image; wherein the boundary lines include a first type of boundary lines which are substantially perpendicular to the bill arrangement direction;

A long line segment which is substantially parallel to the bill arrangement direction and passes through the area where all the bills are located is generated, wherein the long line segment has an intersection point with each first type of boundary line;

The number of bills in the image is determined according to the lengths of the sub-line segments between the adjacent intersection points.

For the specific implementation of each step of the method and related content, please refer to the method embodiment shown in FIG. 1 above, and no further description is narrated herein.

In addition, other implementations of the method for identifying the number of bills in an image realized by the processor 301 executing the program stored on the memory 303 are the same as the implementations mentioned in the foregoing method embodiment, and related description is not narrated herein.

The electronic apparatus provided in the embodiment acquires an image containing multiple bills arranged in sequence, and first processes the image to obtain multiple boundary lines of each bill in the image, and then generates a long line segment that is substantially parallel to the bill arrangement direction and passes through the area where all bills are located.

This long line segment has an intersection point with each first type of boundary line. The number of bills in the image can be determined according to the length of the sub-line segment between each adjacent intersection point. Since the present invention can identify the number of bills in the image, which facilitates subsequent identification of the contents of multiple bills, improves the bill identification speed, and reduces the workload of bill processing personnel.

The electronic apparatus may be a computing device such as a desktop computer, a notebook, a palmtop computer, and a cloud server. The communication bus mentioned in the above description related to the electronic apparatus may be a Peripheral Component Interconnect (PCI) bus or an Extended Industry Standard Architecture (EISA) bus. The communication bus can be divided into address bus, data bus, control bus, etc. For ease of illustration, only one thick line is adopted in the figure to represent the communication bus, but it does not mean that there is only one bus or one type of bus.

The communication interface is configured for communication between the aforementioned electronic apparatus and other apparatuses. The memory may include Random Access Memory (RAM), and may also include Non-Volatile Memory (NVM), such as at least one disk memory. Optionally, the memory may also be at least one storage device located far away from the foregoing processor.

The foregoing processor may be a general-purpose processor, including a Central Processing Unit (CPU), a Network Processor (NP), etc.; and may also be a Digital Signal Processor (DSP), an Application Specific Integrated Circuit (ASIC), a Field-Programmable Gate Array (FPGA) or other programmable logic devices, discrete gates or transistor logic devices, discrete hardware components. The general-purpose processor may be a microprocessor or the processor may also be any conventional processor, etc. The processor is the control center of the electronic apparatus, and various interfaces and lines are used to connect various parts of the entire electronic apparatus.

An embodiment of the present invention also provides a computer-readable storage medium in which a computer program is stored, and when the computer program is executed by a processor, the following steps are implemented:

The image containing multiple bills arranged in sequence is acquired.

The image is processed to obtain multiple boundary lines of each of the bills in the image, and the boundary lines include a first type of boundary lines which are substantially perpendicular to the bill arrangement direction.

A long line segment which is substantially parallel to the bill arrangement direction and passes through the area where all the bills are located is generated, and the long line segment has an intersection point with each first type of boundary line.

The number of bills in the image is determined according to the lengths of the sub-line segments between the adjacent intersection points.

It should be noted that other embodiments of the method for identifying the number of bills in an image realized when the computer program is executed by the processor are the same as the embodiment of the method for identifying the number of bills in an image mentioned in the foregoing section related to method, and thus no further description is narrated herein.

The computer readable storage medium provided in the embodiment acquires an image containing multiple bills arranged in sequence, and first processes the image to obtain multiple boundary lines of each bill in the image, and then generates a long line segment that is substantially parallel to the bill arrangement direction and passes through the area where all bills are located. This long line segment has an intersection point with each first type of boundary line. The number of bills in the image can be determined according to the length of the sub-line segment between each adjacent intersection point. Since the present invention can identify the number of bills in the image, which facilitates subsequent identification of the contents of multiple bills, improves the bill identification speed, and reduces the workload of bill processing personnel.

The computer-readable storage medium may be a tangible device that can retain and store instructions used by the instruction execution device, such as, but not limited to, electrical storage devices, magnetic storage devices, optical storage devices, electromagnetic storage devices, semiconductor storage devices, or any suitable combination of the above. More specific examples (non-exhaustive list) of the computer-readable storage medium include: portable computer disks, hard disks, random access memory (RAM), read-only memory (ROM), erasable programmable read-only memory (EPROM or flash memory), static random access memory (SRAM), portable compact disk read-only memory (CD-ROM), digital versatile disk (DVD), memory stick, floppy disk, mechanical encoding device, such as the punched card or the convex structure in the recess with instructions stored thereon, and any suitable combination of the above. The computer program described here can be downloaded from the computer-readable storage medium to each computing/processing device, or downloaded to an external computer or external storage device through a network, such as the Internet, a local area network, a wide area network, and/or a wireless network. The network may include copper transmission cables, optical fiber transmission, wireless transmission, routers, firewalls, switches, gateway computers, and/or edge servers. The network adapter card or network interface in each computing/processing device receives the computer program through the network, and forwards the computer program for storage in the computer-readable storage medium in each computing/processing device. The computer program used to perform the operations of the present invention can be assembly instructions, instruction set architecture (ISA) instructions, machine instructions, machine-related instructions, microcode, firmware instructions, status setting data, or source code or object code written in one or any combination of multiple programming languages. The programming language includes object-oriented programming languages such as Smalltalk, C++, etc., and conventional procedural programming languages such as "C" language or similar programming languages. The computer program can be entirely executed on the user's computer, partly executed on the user's computer, executed as an independent software package, partly executed on the user's computer and partly executed on a remote computer, or entirely executed on the remote computer or server. In the case of a remote computer, the remote computer can be connected to the user's computer through any kind of network, including a local area network (LAN) or a wide area network (WAN), or it can be connected to an external computer (for example, using an Internet service provider to access the Internet connection). In some embodiments, an electronic circuit, such as a programmable logic circuit, a field programmable gate array (FPGA), or a programmable logic array (PLA), can be customized by using the status information of the computer program. The electronic circuit can execute computer-readable program instructions to implement various aspects of the present invention.

Embodiment 2

Further, in order to solve the problems of the related art, embodiments of the present invention also provide a method and device for identifying multiple bill areas in an image, an electronic apparatus, and a computer-readable storage medium.

It should be noted that the method for identifying multiple bill areas in an image according to an embodiment of the present invention can be applied to a device for identifying multiple bill areas in an image according to an embodiment of the present invention. The device for identifying multiple bill areas in an image can be configured on an electronic apparatus. Specifically, the electronic apparatus may be a personal computer, a mobile terminal, etc., and the mobile terminal may be a hardware device with various operating systems such as a mobile phone or a tablet computer.

Figure 7:
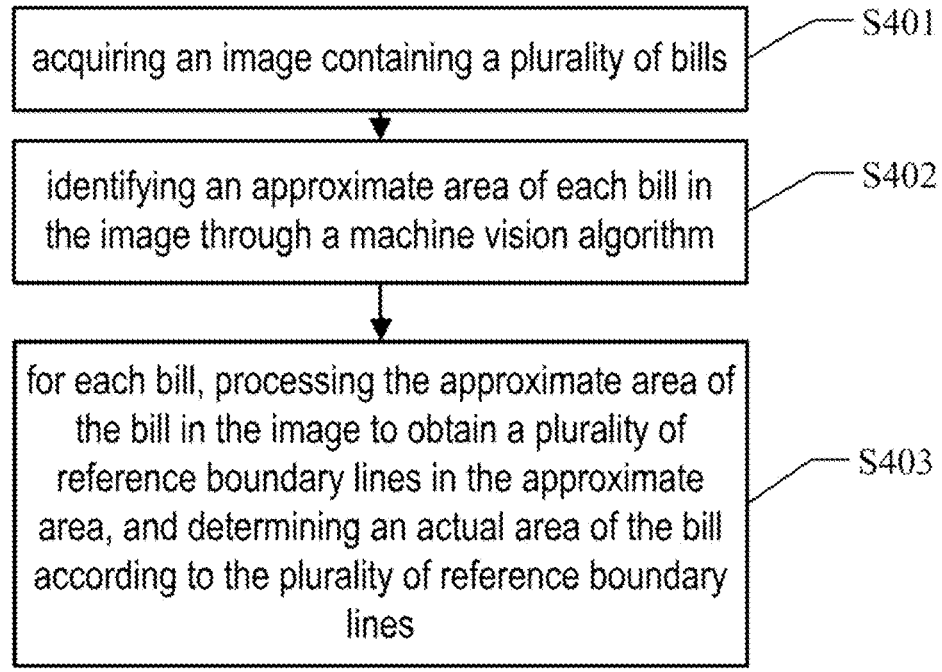
FIG. 7 is a schematic flowchart of a method for identifying multiple bill areas in an image according to an embodiment of the present invention.

FIG. 7 is a schematic flowchart of a method for identifying multiple bill areas in an image according to an embodiment of the present invention. Please refer to FIG. 7, a method for identifying multiple bill areas in an image may include the following steps:

Step S401: The image containing multiple bills is acquired.

The image is a photographed picture showing multiple bills arranged together, and the multiple bills may be arranged in sequence without overlapping each other, and may be arranged in the manner of overlapping each other. The types of bills can be: invoices, bills, tax bills, receipts, shopping lists, catering receipts, insurance policies, reimbursement forms, express orders, itineraries, tickets and other documents containing the payment amount. The multiple bills may be of the same type or different types, the embodiment provides no limitation thereto.

Step S402: The approximate area of each bill in the image is identified through a machine vision algorithm.

The machine vision algorithm may be an object detection algorithm, etc., such as RCNN, Fast R-CNN, Faster R-CNN, Mask R-CNN. Among the above algorithms, Mask-RCNN algorithm is an improved version of Faster-RCNN. Mask R-CNN is an instance segmentation algorithm. By adding different branches, the algorithm can complete multiple tasks such as target classification, target detection, semantic segmentation, instance segmentation, and human pose identification, and thus being flexible and powerful.

Mask-RCNN can identify whether the bill on the image is a single sheet or multiple sheets, and can identify the specific number of bills. In the meantime, Mask-RCNN can segment the mask of the area where each bill is located to obtain the mask map. The position of each mask area will be marked through a bounding rectangular frame (classification regression), that is, the approximate positions of multiple bills in the image can be acquired through the machine vision algorithm and the approximate positions can be marked with a label frame.

In step S402, the approximate area of each bill marked by the label frame can be divided into independent image areas, so that in step S403, the image area corresponding to each bill can be processed to obtain multiple reference boundary lines for subsequent processing.

Step S403: For each bill, the approximate area of the bill in the image is processed to obtain multiple reference boundary lines in the approximate area, and the actual area of the bill is determined according to the multiple reference boundary lines.

In this embodiment, an edge detection method can be utilized for the approximate area of each bill to find the boundary line, and then the actual area of the bill is finally determined according to the boundary line. The reason for determining the boundary line is that there might be other interference that interferes the approximate area of the bill obtained in step S402, such as other stacked bills, other objects within the frame range, etc. Therefore, the actual area of the bill needs to be determined.

After obtaining the reference boundary line of the approximate area of a bill, the step of determining the actual area of the bill according to the multiple reference boundary lines may include: obtaining multiple intersection points of the multiple reference boundary lines, and using the internal area defined by the multiple intersection points and the multiple reference boundary lines as the actual area of the bill.

Figure 8A:
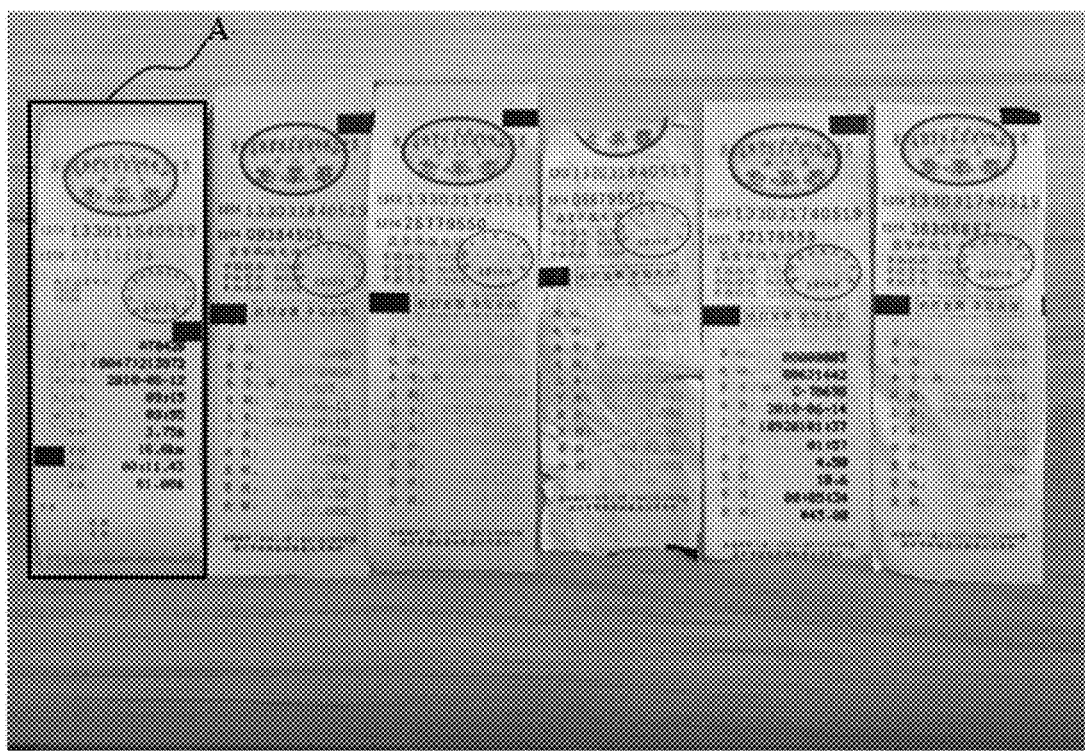
FIG. 8A to FIG. 8B are diagrams showing examples where the bills in the image are arranged in sequence without overlapping each other.
Figure 8B:
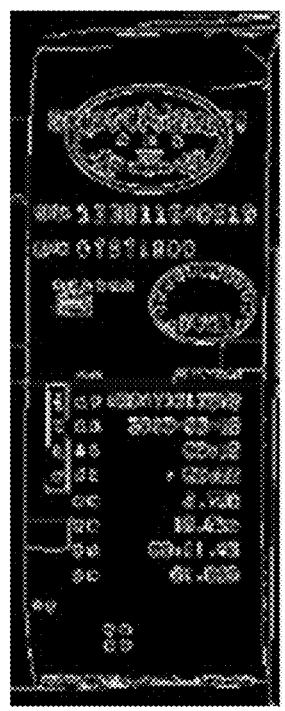

For example, as shown in the image shown in FIG. 8A, the image contains six bills, and each bill is arranged in sequence without overlapping each other. In step S402, the machine vision algorithm can be used to identify the approximate area of each bill in the image. FIG. 8A only exemplifies the approximate area A of a bill, and then in step S403, the approximate area A is processed by the edge detection algorithm, and multiple references boundary lines in the approximate area A can be obtained, such as the reference boundary lines corresponding to the upper, lower, left, and right sides of the bill in FIG. 8B. Thereafter, these four boundary lines are extended to obtain the lines to obtain four intersection points. These four intersection points and the four boundary lines jointly define an internal area, and this internal area is the actual area of the bill. The identification method of the other five bills in FIG. 8A is the same as the identification method of the bill, and no further description is narrated herein. After the actual area of each bill is obtained, the actual area of each bill can be cut from the image and output as a single bill picture for safekeeping.

Figure 9A:
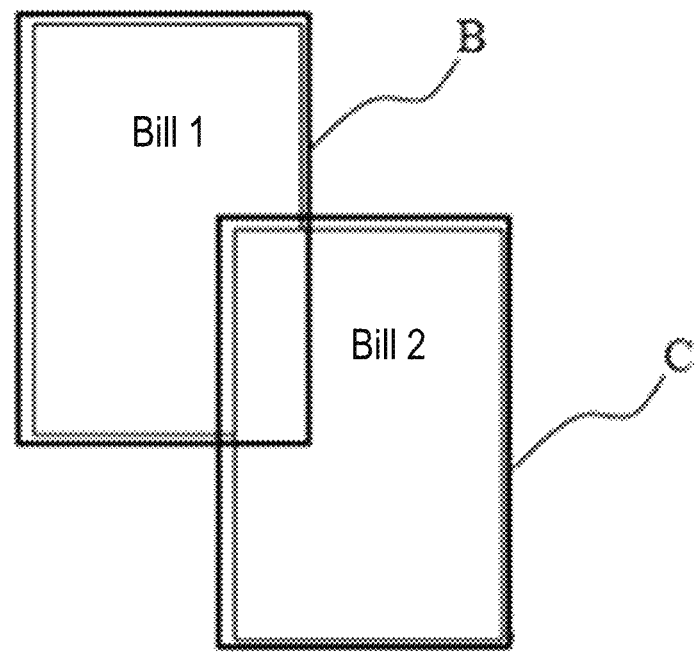
FIG. 9A to FIG. 9B are examples of overlapping bills in the image.
Figure 9B:
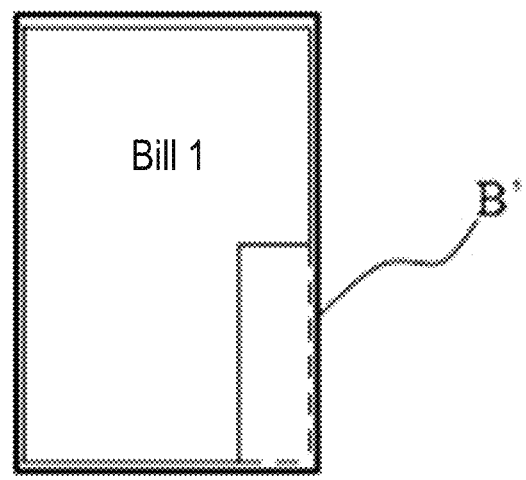

Referring to the schematic diagram of bill shown in FIG. 9A, there are two bills in the image and the two bills partially overlap each other in the manner that the upper left corner of the bill 2 on the right side covers the lower right corner of the bill 1 on the left side. In step S402, the machine vision algorithm is adopted to identify the approximate areas B and C where the two bills are located. Since the bill 2 on the right partially covers the bill 1 on the left, for the bill 1 on the left, its approximate area B involves a partial area of the bill 2 on the right. Therefore, in step S403, the edge detection is performed on the approximate area B, and the obtained reference boundary line is the solid line as shown in FIG. 9B. In fact, the two short solid boundary lines in the lower right corner are the boundary lines of the bill 2 instead of the reference boundary lines of the bill on the left. However, since the bill content in the partial area of the bill 1 covered by the bill 2 can no longer be identified, the actual area of the bill 1 can be regarded as the internal area defined after all the solid boundary lines in FIG. 9B are intersected, such that the bill content in the actual area can be identified subsequently.

In addition, the solid boundary lines on the right side and lower side of the bill 1 can be extended (the dashed line shown in FIG. 9B can be obtained) to complete the intersection. The area B' formed jointly by the extended solid boundary line and the solid boundary lines on the left side and upper side can be segmented to form the bill picture of bill 1.

The identification method of the bill 2 in FIG. 9A is the same as the identification method of the bill in FIG. 8A, and no further description is narrated herein.

In this embodiment, after the actual area of each bill is determined, for each bill, the preset bill identification model can be adopted to identify the bill content in the actual area of the bill, such as identifying the payment amount and issuing time of the bill, the name and location of the shop where the bill is issued and so on. The preset bill identification model is a pre-trained neural network model such as a convolutional neural network model.

In the following, the method of performing the edge detection method to find the reference boundary line for the approximate area of each bill in step S403 will be described.

Figure 10:
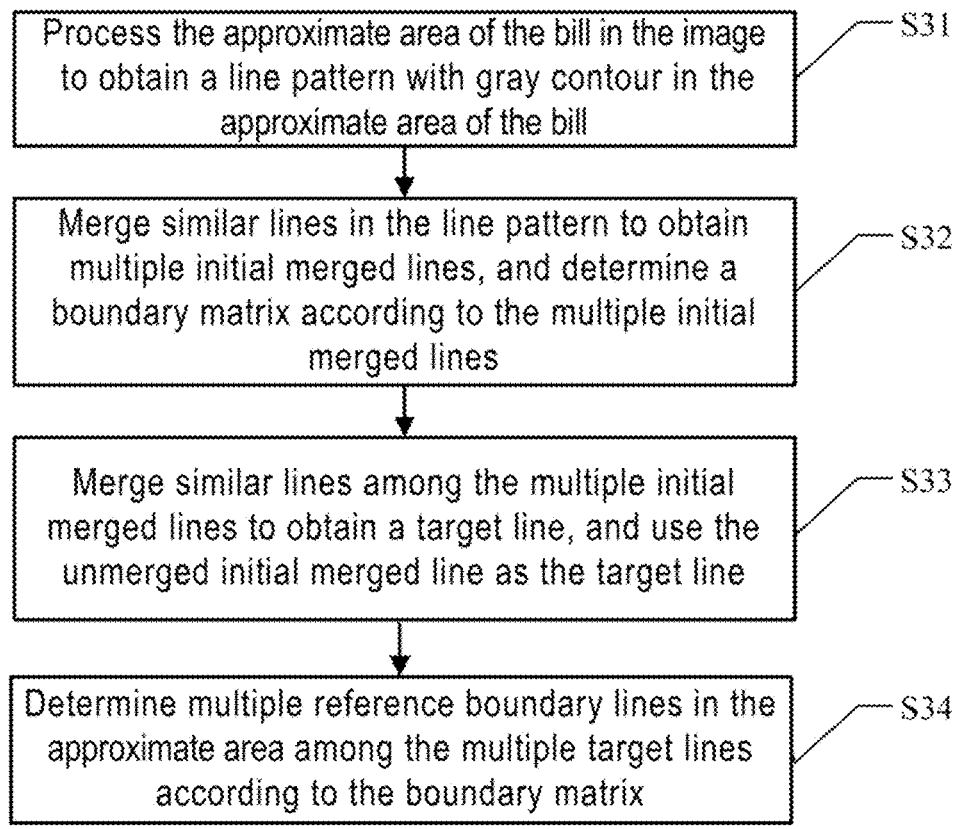
FIG. 10 is a schematic diagram of the process of step S103 in the method for identifying multiple bill areas in an image shown in FIG. 7.

Specifically, as shown in FIG. 10, in step S403, an approximate area of a bill in the image is processed to obtain multiple reference boundary lines in the approximate area, and the step includes the following steps:

S31: The approximate area of the bill in the image is processed to obtain a line pattern with gray contour in the approximate area of the bill.

S32: Similar lines in the line pattern are merged to obtain multiple initial merged lines, and a boundary matrix is determined according to the multiple initial merged lines.

S33: Similar lines among the multiple initial merged lines are merged to obtain a target line, and the unmerged initial merged line are also used as the target line.

S34: The multiple reference boundary lines in the approximate area among the multiple target lines are determined according to the boundary matrix.

Specifically, the specific implementation method of processing the approximate area of the bill in the image to obtain multiple reference boundary lines in the approximate area can be derived from the specific implementation method provided in the Embodiment 1, in which the image is processed to obtain the multiple boundary lines of each bill in the image, that is, reference may be made to the specific description regarding step S21 to step S24 in the Embodiment 1, and thus no further description is narrated herein.

Then, after obtaining the actual area of the bill for each bill, each bill area can be cut and output as a single bill picture for safekeeping, or the preset bill identification model is adopted to identify the bill information and identify the content of each bill. The bill identification is performed, for example, by using a convolutional neural network model.

In addition, after obtaining multiple reference boundary lines in the approximate area, the following steps S35 to S37 can be performed to accurately find the edges of the bills in each approximate area, and each bill can be segmented and identified later.

S35: The approximate area is identified through a pre-trained boundary line area identification model to obtain multiple boundary line areas of the bill in the approximate area; wherein the boundary line area identification model is a neural network-based model.

S36: For each boundary line area, a target boundary line corresponding to the boundary line area among multiple reference boundary lines is determined.

S37: The edge of the bill in the approximate area is determined according to the determined multiple target boundary lines.

In step S35, the boundary line area identification model is established through machine learning training. This model may be a neural network-based model. The boundary line area identification model may be trained through the following process. Each image sample in the image sample set is marked to label the boundary area, internal area and external area of the bill in each image sample; and the neural network is trained through the marked image sample set to obtain the boundary line area identification model.

The boundary line area identification model established through machine learning training is utilized to identify the approximate area of the bill, and the boundary line area, the internal area (i.e., the area where the bill is located) and the external area (i.e., the area outside the bill) among the approximate area can be identified, thereby acquiring multiple pieces (e.g., 4 pieces) of the edge contour diagram (that is, the boundary line area of the bill in the approximate area) in each direction of the approximate area. In this case, the edge contour is thicker.

In step S36, for each boundary line area, the step of determining a target boundary line corresponding to the boundary line area among the multiple reference boundary lines may include: firstly, the slope of each of the reference boundary lines is calculated; then, for each of the boundary line areas, the boundary line area is transformed into multiple straight lines, and the average slope of the multiple straight lines is calculated, and then it is determined whether, among the multiple reference boundary lines, there is a reference boundary line whose slope matches the average slope. If such reference boundary line exists, the reference boundary line is determined as the target boundary line corresponding to the boundary line area. Specifically, Hough transform can be adopted to transform the boundary line area into the multiple straight lines. Certainly, other methods may be adopted for transformation, and the embodiment provides no limitation thereto.

In this embodiment, the edge contour in the boundary line area is relatively thick. For each boundary line area, the Hough transform can be utilized to transform the boundary line area into multiple straight lines. These lines have similar slopes to obtain the average slope. Then the average slope is compared with the slope of each reference boundary line to determine whether, among the multiple reference boundary lines, there is a reference boundary line whose slope matches the average slope, that is, to find the most similar reference boundary line from the multiple reference boundary lines to be used as the target boundary line corresponding to the boundary line area.

Since the difference between the slope of the determined target boundary line and the average slope cannot be too large, when comparing the average slope with the slope of each reference boundary line, a comparison threshold is set. When the absolute value of the difference between the slope of a reference boundary line and the average slope is less than the comparison threshold, it is determined that the reference boundary line has a slope that matches the average slope, thereby determining that reference boundary line is the target boundary line corresponding to the boundary line area.

Further, for each of the boundary line areas, if it is determined that, among the multiple reference boundary lines, there is no reference boundary line whose slope matches the average slope, the following processing is performed. For each straight line obtained by transforming the boundary line area, the line matrix formed by the straight line is compared with the boundary matrix to calculate the number of pixel points belonging to the boundary matrix on the straight line, and the number of pixel points serves as the score of the straight line. The straight line with the best score is determined as the target boundary line corresponding to the boundary line area. If there are multiple straight lines with the best score, the straight line that is sorted out first according to the sorting algorithm is adopted as the optimal boundary line. Specifically, the line matrix is determined according to the following method. The straight lines are re-illustrated, and the position information of the pixel points in all the re-illustrated lines is set to correspond to the entire image matrix. The values of the positions of the pixel points of these lines in the image matrix are set as the first value, and the values of the positions of the pixel points other than these lines are set as the second value, thereby forming a line matrix. The forming method of the line matrix is similar to that of the boundary matrix, and thus no further description is narrated herein.

If the target boundary line corresponding to a certain boundary line area cannot be found from the reference boundary line, a determining step is performed on the line matrix, which is formed by the corresponding multiple straight lines obtained from Hough transform according to the matrix forming method described in step S32 and S34, so as to determine which straight line has pixel point that falls into the boundary matrix with the best score, and such straight line is regarded as the target boundary line corresponding to the boundary line area. The method of comparing the line matrix formed by straight line with the boundary matrix to calculate the score of straight line can be derived from the description related to step S34, and thus no further description is narrated herein.

In step S37, after multiple target boundary lines are determined, since each target boundary line corresponds to a boundary line area of the bill in the approximate area, the multiple target boundary lines constitute the edge of the bill in the approximate area.

Further, multiple intersection points of multiple target boundary lines can be obtained, and perspective transformation is performed on the area defined by the multiple intersection points and the multiple target boundary lines to obtain a front view of the bill in the approximate area. Every two adjacent target boundary lines intersect to obtain an intersection point, and each intersection point and each target boundary line jointly define the area where the bill is located in the approximate area.

Perspective transformation is to project the picture to a new viewing plane, and is also known as projective mapping. Since the real shape of the object has changed in the image obtained by taking pictures, that is, geometric distortion has occurred. Therefore, by performing perspective transformation on the area where the bill is located in the approximate area, the area where the bill is located in the approximate area can be transformed from a parallelogram to a square, that is, the area where the bill is located in the approximate area is corrected, thereby removing the influence of geometric distortion, and obtaining the front view of the bill in the approximate area. Specifically, perspective transformation is to process the pixels according to the spatial projection conversion coordinates to obtain the front view, and no further description is narrated herein.

Through the above processing, the edge of the bill in each approximate area can be accurately found, so that each bill area can be cut out according to the edge of the bill to serve as a single bill picture. Moreover, the preset bill identification model can be adopted for information identification, or each bill area is directly subjected to information identification by using the bill identification model without cutting.

In summary, the method for identifying multiple bill areas in an image provided in this embodiment includes the following steps. An image containing multiple bills is acquired, and first the approximate area of each bill in the image is identified. Then for each bill, an edge detection processing is performed on the approximate area of the bill to obtain multiple reference boundary lines in the approximate area of the bill, thereby determining the actual area of the bill according to the multiple reference boundary lines, such that the actual area of each bill can be subjected to bill identification. Since the embodiment can process the image containing multiple bills, there is no need to separately collect the image of each bill for identification respectively, it is possible to realize processing multiple bills simultaneously, improve the bill identification speed, and reduces the workload of bill processing personnel.

Figure 11:
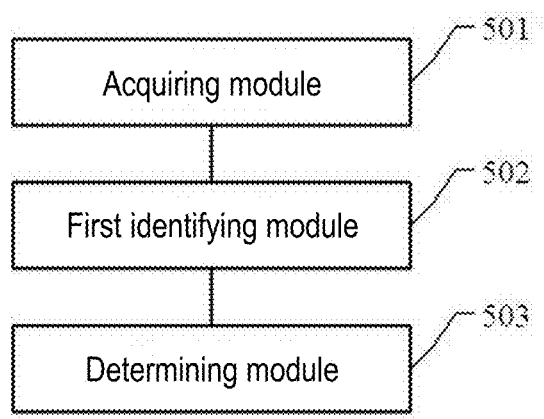
FIG. 11 is a schematic structural diagram of a device for identifying multiple bill areas in an image according to an embodiment of the present invention.

Corresponding to the foregoing embodiment of method, an embodiment of the present invention further provides a device for identifying multiple bill areas in an image. Please refer to FIG. 11. FIG. 11 is a schematic structural diagram of a device for identifying multiple bill areas in an image according to an embodiment of the present invention. A device for identifying multiple bill areas in an image may include:

An acquiring module 501 is configured to acquire an image containing multiple bills.

A first identifying module 502 is configured to identify the approximate area of each bill in the image through a machine vision algorithm.

A determining module 503 is configured to process the approximate area of the bill in the image for each bill, so as to obtain multiple reference boundary lines in the approximate area, and determine the actual area of the bill according to the multiple reference boundary lines.

The device for identifying multiple bill areas in an image provided in this embodiment may perform the following operations. An image containing multiple bills is acquired, and first the approximate area of each bill in the image is identified. Then for each bill, an edge detection processing is performed on the approximate area of the bill to obtain multiple reference boundary lines in the approximate area of the bill, thereby determining the actual area of the bill according to the multiple reference boundary lines, such that the actual area of each bill can be subjected to bill identification. Since the embodiment can process the image containing multiple bills, there is no need to separately collect the image of each bill for identification respectively, it is possible to realize processing multiple bills simultaneously, improve the bill identification speed, and reduces the workload of bill processing personnel.

Optionally, the machine vision algorithm is a target detection algorithm.

Optionally, the method for the determining module 503 to determine the actual area of the bill according to multiple reference boundary lines includes the following steps.

Multiple intersection points of multiple reference boundary lines are obtained, and the internal area defined by the multiple intersection point and the multiple reference boundary lines is used as the actual area of the bill.

Optionally, the device further includes:

A second identifying module is configured to use a preset bill identification model for each bill to identify the bill content in the actual area of the bill.

Optionally, the determining module 503 includes:

A sub-obtaining module is configured to process the approximate area of the bill in the image to obtain a line pattern with gray contour in the approximate area of the bill.

A first sub-merging module is configured to merge similar lines in the line pattern to obtain multiple initial merged lines, and determine a boundary matrix according to the multiple initial merged lines.

A second sub-merging module is configured to merge similar lines among the multiple initial merged lines to obtain a target line, and use the unmerged initial merged line as the target line.

A first sub-determining module is configured to determine multiple reference boundary lines in the approximate area among the multiple target lines according to the boundary matrix.

Optionally, the sub-obtaining module processes the approximate area of the bill in the image, and the method for obtaining a line pattern with gray contour in the approximate area of the bill includes:

The approximate area of the bill in the image is processed through an edge detection algorithm based on OpenCV to obtain the line pattern with gray contour in the approximate area of the bill.

Optionally, the first sub-merging module is specifically configured to:

Acquire a long line in the line pattern; wherein the long line is a line whose length exceeds a first preset threshold;

Acquire multiple groups of first type of lines from the long lines; wherein the first type of lines include at least two successively adjacent long lines, and the angles between any two adjacent long lines are all smaller than the second preset threshold;

For each group of first type of lines, sequentially merge the long lines in the group of first type of lines to obtain an initial merged line.

Optionally, the second sub-merging module is specifically configured to:

Acquire multiple groups of second type of lines from the multiple initial merged lines; wherein the second type of lines include at least two successively adjacent initial merged lines, and the angles between any two adjacent initial merged lines are all less than the third preset threshold;

For each group of second type of lines, sequentially merge each initial merged line in the group of second type of lines to obtain a target line.

Optionally, the boundary matrix is determined in the following manner. The multiple initial merged lines and the unmerged lines among the long lines are re-illustrated, and the position information of the pixel points in all the re-illustrated lines is set to correspond to the entire image matrix. The values of the positions of the pixel points of these lines in the image matrix are set as the first value, and the values of the positions of the pixel points other than these lines are set as the second value, thereby forming a boundary matrix.

Optionally, multiple reference boundary lines of each bill among the multiple target lines are determined according to the boundary matrix by the first sub-determining module, including:

For each of the target lines, the target line is extended, and then a line matrix is determined according to the extended target line. Thereafter, the line matrix is compared with the boundary matrix, and the number of pixel points belonging to the boundary matrix on the extended target line is calculated to serve as the score of the target line, wherein the line matrix is the same size as the boundary matrix.

Multiple reference boundary lines among the multiple target lines are determined according to the score of each target line.

Optionally, the line matrix is determined in the following manner. The extended target line is re-illustrated, the position information of the pixel points in the re-illustrated line is set to correspond to the entire image matrix, and the value of the position of the pixel point of the line in the image matrix is set as the first value, and the value of the position of the pixel points other than the line is set as the second value, thereby forming a line matrix.

Optionally, the determining module 503 further includes:

A sub-identifying module is configured to identify the approximate area through the pre-trained boundary line area identification model after the first sub-determining module obtains the multiple reference boundary lines in the approximate area, so as to obtain multiple boundary line areas of the bills in the approximate area; wherein the boundary line area identification model is a neural network-based model.

A second sub-determining module is configured to, for each boundary line area, determine a target boundary line corresponding to the boundary line area among the multiple reference boundary lines.

A third sub-determining module is configured to determine the edge of the bill in the approximate area according to the determined multiple target boundary lines.

Optionally, the second sub-determining module is specifically configured to:

Calculate the slope of each reference boundary line;

For each boundary line area, transform the boundary line area into multiple straight lines, calculate the average slope of the multiple straight lines, and then determine whether there is a reference boundary line having a slope that matches the average slope among the multiple reference boundary lines. If such reference boundary line exists, the reference boundary line is determined as the target boundary line corresponding to the boundary line area.

Optionally, the second sub-determining module is further configured to perform the following operation.

For each of the boundary line areas, if it is determined that, among the multiple reference boundary lines, there is no reference boundary line whose slope matches the average slope, for each straight line obtained by transforming the boundary line area, the line matrix formed by the straight line is compared with the boundary matrix to calculate the number of pixel points belonging to the boundary matrix on the straight line, and the number of pixel points serves as the score of the straight line. The straight line with the best score is determined as the target boundary line corresponding to the boundary line area; wherein the line matrix is the same size as the boundary matrix.

Optionally, the determining module 503 further includes:

A sub-transformation module is configured to obtain multiple intersection points of the multiple target boundary lines after the third sub-determining module determines the edge of the bill in the approximate area, and to perform perspective transformation on the area defined by the multiple intersection points and the multiple target boundary lines, so as to obtain the front view of the object in the image.

An embodiment of the present invention further provides an electronic apparatus.

Figure 12:
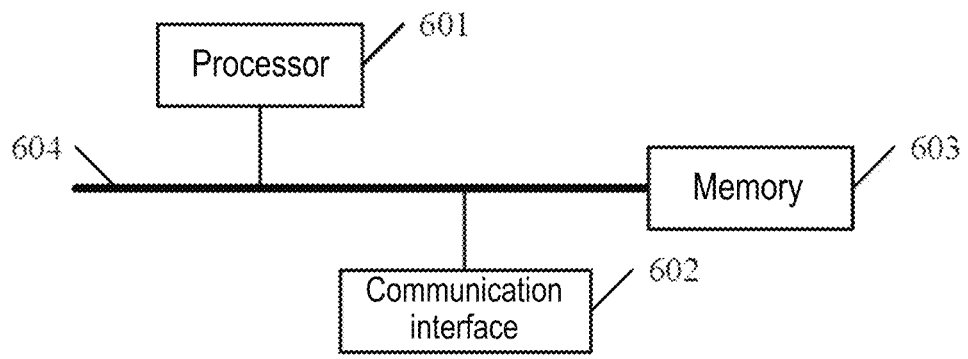
FIG. 12 is a schematic structural diagram of an electronic apparatus according to an embodiment of the present invention.

FIG. 12 is a schematic structural diagram of an electronic apparatus according to an embodiment of the present invention. Referring to FIG. 12, an electronic apparatus includes a processor 601, a communication interface 602, a memory 603, and a communication bus 604, wherein the processor 601, the communication interface 602, and the memory 603 complete communication with each other through the communication bus 604.

The memory 603 is configured to store computer programs.

The processor 601 is configured to implement the following steps when executing the program stored in the memory 603.

The image containing multiple bills arranged in sequence is acquired.

The approximate area of each bill in the image is identified through a machine vision algorithm.

For each bill, the approximate area of the bill in the image is processed to obtain multiple reference boundary lines in the approximate area, and the actual area of the bill is determined according to the multiple reference boundary lines.

The specific implementation of each step of the method and related description can be derived from the embodiment of method shown in FIG. 7, and thus no further description is narrated herein.

In addition, other implementations of the method for identifying the multiple bill areas in an image realized by the processor 601 executing the program stored on the memory 603 are the same as the implementations mentioned in the foregoing method embodiment, and related description is not narrated herein.

The electronic apparatus provided in the embodiment can perform the following operations. An image containing multiple bills is acquired, and first the approximate area of each bill in the image is identified. Then for each bill, an edge detection processing is performed on the approximate area of the bill to obtain multiple reference boundary lines in the approximate area of the bill, thereby determining the actual area of the bill according to the multiple reference boundary lines, such that the actual area of each bill can be subjected to bill identification. Since the embodiment can process the image containing multiple bills, there is no need to separately collect the image of each bill for identification respectively, it is possible to realize processing multiple bills simultaneously, improve the bill identification speed, and reduces the workload of bill processing personnel.

The electronic apparatus may be a computing device such as a desktop computer, a notebook, a palmtop computer, and a cloud server. The communication bus mentioned in the above description related to the electronic apparatus may be a Peripheral Component Interconnect (PCI) bus or an Extended Industry Standard Architecture (EISA) bus. The communication bus can be divided into address bus, data bus, control bus, etc. For ease of illustration, only one thick line is adopted in the figure to represent the communication bus, but it does not mean that there is only one bus or one type of bus.

The communication interface is configured for communication between the aforementioned electronic apparatus and other apparatuses. The memory may include Random Access Memory (RAM), and may also include Non-Volatile Memory (NVM), such as at least one disk memory. Optionally, the memory may also be at least one storage device located far away from the foregoing processor.

The foregoing processor may be a general-purpose processor, including a Central Processing Unit (CPU), a Network Processor (NP), etc.; and may also be a Digital Signal Processor (DSP), an Application Specific Integrated Circuit (ASIC), a Field-Programmable Gate Array (FPGA) or other programmable logic devices, discrete gates or transistor logic devices, discrete hardware components. The general-purpose processor may be a microprocessor or the processor may also be any conventional processor, etc. The processor is the control center of the electronic apparatus, and various interfaces and lines are used to connect various parts of the entire electronic apparatus.

An embodiment of the present invention further provides a computer-readable storage medium in which a computer program is stored, and when the computer program is executed by the processor, the following steps are implemented.

An image containing multiple bills is acquired.

An approximate area of each bill in the image is identified through a machine vision algorithm.

For each bill, the approximate area of the bill in the image is processed to obtain multiple reference boundary lines in the approximate area, and an actual area of the bill is determined according to the multiple reference boundary lines.

It should be noted that other embodiments of the method for identifying multiple bill areas in an image that are implemented when the computer program is executed by the processor are the same as the embodiment of the method for identifying multiple bill areas in an image mentioned in the aforementioned method section, and thus no further description is narrated herein.

The computer-readable storage medium provided in the embodiment can perform the following operations. An image containing multiple bills is acquired, and first the approximate area of each bill in the image is identified. Then for each bill, an edge detection processing is performed on the approximate area of the bill to obtain multiple reference boundary lines in the approximate area of the bill, thereby determining the actual area of the bill according to the multiple reference boundary lines, such that the actual area of each bill can be subjected to bill identification. Since the embodiment can process the image containing multiple bills, there is no need to separately collect the image of each bill for identification respectively, it is possible to realize processing multiple bills simultaneously, improve the bill identification speed, and reduces the workload of bill processing personnel.

The computer-readable storage medium may be a tangible device that can retain and store instructions used by the instruction execution device, such as, but not limited to, electrical storage devices, magnetic storage devices, optical storage devices, electromagnetic storage devices, semiconductor storage devices, or any suitable combination of the above. More specific examples (non-exhaustive list) of the computer-readable storage medium include: portable computer disks, hard disks, random access memory (RAM), read-only memory (ROM), erasable programmable read-only memory (EPROM or flash memory), static random access memory (SRAM), portable compact disk read-only memory (CD-ROM), digital versatile disk (DVD), memory stick, floppy disk, mechanical encoding device, such as the punched card or the convex structure in the recess with instructions stored thereon, and any suitable combination of the above. The computer program described here can be downloaded from the computer-readable storage medium to each computing/processing device, or downloaded to an external computer or external storage device through a network, such as the Internet, a local area network, a wide area network, and/or a wireless network. The network may include copper transmission cables, optical fiber transmission, wireless transmission, routers, firewalls, switches, gateway computers, and/or edge servers. The network adapter card or network interface in each computing/processing device receives the computer program through the network, and forwards the computer program for storage in the computer-readable storage medium in each computing/processing device. The computer program used to perform the operations of the present invention can be assembly instructions, instruction set architecture (ISA) instructions, machine instructions, machine-related instructions, microcode, firmware instructions, status setting data, or source code or object code written in one or any combination of multiple programming languages. The programming language includes object-oriented programming languages such as Smalltalk, C++, etc., and conventional procedural programming languages such as "C" language or similar programming languages. The computer program can be entirely executed on the user's computer, partly executed on the user's computer, executed as an independent software package, partly executed on the user's computer and partly executed on a remote computer, or entirely executed on the remote computer or server. In the case of a remote computer, the remote computer can be connected to the user's computer through any kind of network, including a local area network (LAN) or a wide area network (WAN), or it can be connected to an external computer (for example, using an Internet service provider to access the Internet connection). In some embodiments, an electronic circuit, such as a programmable logic circuit, a field programmable gate array (FPGA), or a programmable logic array (PLA), can be customized by using the status information of the computer program. The electronic circuit can execute computer-readable program instructions to implement various aspects of the present invention.

The various aspects of the present invention are described herein with reference to flowcharts and/or block diagrams of methods, systems and computer program products provided in the embodiments of the present invention. It should be understood that each block of the flowchart and/or block diagram and the combination of each block in the flowchart and/or block diagram can be implemented by a computer program. These computer programs can be provided to the processors of general-purpose computers, special-purpose computers, or other programmable data processing devices to produce a machine. In this manner, when the programs are executed by the processors of the computer or other programmable data processing devices, a device that implements the functions/actions specified in one or more blocks in the flowcharts and/or block diagrams is produced. In the meantime, these computer programs can also be stored in a computer-readable storage medium. These computer programs allow computers, programmable data processing devices, and/or other devices to work in a specific manner, so that the computer-readable storage medium that stores the computer programs includes a product, which includes instructions for implementing various aspects of the functions/actions specified in one or more blocks in the flowchart and/or block diagram. The computer program can also be loaded on a computer, other programmable data processing device, or other equipment, so that a series of operation steps are executed on the computer, other programmable data processing devices, or other equipment to generate a computer-implemented process. As such, a computer program executed on a computer, other programmable data processing devices, or other device implements the functions/actions specified in one or more blocks in the flowchart and/or block diagram.

It should be noted that the various embodiments in this specification are described in a related manner, and the same or similar parts of the various embodiments can be derived from each other. The focus of embodiments lies in the difference between various embodiments. Particularly, in terms of the embodiments of the device, the electronic apparatus, and the computer-readable storage medium, since they are basically similar to the embodiment of method, they are described in a simple manner, and related parts can be derived from part of the description of the embodiment of method.

In this specification, relationship terms such as first and second are only used to distinguish one object or operation from another object or operation, and do not necessarily indicate or imply that the objects or operations are actually associated with each other in the relationship or sequence. Moreover, the terms "include", "comprise" or any other variants thereof are intended to cover non-exclusive inclusion, so that a process, method, article or device including a series of elements not only includes those elements, but also includes those that are not explicitly listed, or the elements inherently included in the process, method, article or equipment. If there are no further limitations, the element defined by the sentence "including a . . . " does not exclude the existence of other identical elements in the process, method, article, or equipment that includes the element. The terms used herein are only used for the purpose of describing specific embodiments and are not intended to limit the present invention. As used herein, the singular forms "a", "an", and "the" are intended to also include the plural forms, unless the context clearly indicates otherwise. As used herein, the term "and/or" includes any and all combinations of one or more related listed items. When expressions such as "at least one of" follow a list of elements, they modify the entire list of elements instead of modifying individual elements in the list. As used herein, the terms "substantially", "about" and similar terms are used to describe proximity rather than level or degree, and are intended to indicate inherent deviations in measured or calculated values, which will be determined by those of ordinary skill in the art. In addition, when describing the embodiments of the present invention, the use of "may" refers to "one or more embodiments of the present invention." As used herein, the terms "uses", "is using" and "used" can be considered as synonymous with the terms "utilizes", "is utilizing" and "utilized" respectively. Likewise, the term "exemplary" is intended to indicate an instance or example.

The foregoing description is only a description of the preferred embodiments of the present invention, and is not intended to limit the scope of the present invention. Any changes or modifications made by persons of ordinary skill in the field of the present invention based on the foregoing disclosure fall within the protection scope of the claims.

What is claimed is:

1. A method for identifying a number of bills in an image, the method comprises:
    acquiring the image containing multiple bills arranged in sequence;
    processing the image to obtain multiple boundary lines of each of the bills in the image, wherein the multiple boundary lines comprise a first type of boundary lines which are substantially perpendicular to a bill arrangement direction;
    generating a long line segment which is substantially parallel to the bill arrangement direction and passes through an area where all the bills are located, wherein the long line segment has an intersection point with each of the first type of boundary lines;
    determining the number of the bills in the image according to lengths of sub-line segments between each of the adjacent intersection points.

2. The method for identifying the number of bills in the image according to claim 1, wherein the step of determining the number of the bills in the image according to the lengths of the sub-line segments between each of the adjacent intersection points comprises:
    determining, according to the lengths of the sub-line segments between each of the adjacent intersection points, at least one target sub-line segment among the sub-line segments in sequence according to an arrangement sequence of the intersection points, wherein each of the target sub-line segments is a longest sub-line segment among the target sub-line segment and the multiple sub-line segments adjacent to the target sub-line segment;
    determining the number of the bills in the image according to a number of the determined target sub-line segment.

3. The method for identifying the number of bills in the image according to claim 2, wherein after the number of the bills in the image is determined, the method further comprises:
    determining a second reduction ratio of a resolution of the image according to a length of the target sub-line segment,
    reducing the resolution of the image according to the second reduction ratio.

4. The method for identifying the number of bills in the image according to claim 1, wherein after the number of the bills in the image is determined, the method further comprises:
    determining a first reduction ratio of a resolution of the image according to the number of the bills;
    reducing the resolution of the image according to the first reduction ratio.

5. The method for identifying the number of bills in the image according to claim 1, wherein the multiple bills in the image are arranged sequentially in a single row; or, the multiple bills in the image are arranged sequentially in multiple rows, and for each row of bills, a long line segment that is parallel to the bill arrangement direction corresponding to the row of bills and passes through an area where all the bills of the row are located is generated.

6. The method for identifying the number of bills in the image according to claim 1, wherein the step of processing the image to obtain the multiple boundary lines of each of the bills in the image comprises:
    processing the image to obtain a line pattern with a gray contour in the image;
    merging similar lines in the line pattern to obtain multiple initial merged lines, and determining a boundary matrix according to the multiple initial merged lines;
    merging similar lines among the multiple initial merged lines to obtain target lines, wherein the target lines further comprise the initial merged lines that are not merged;
    determining the multiple boundary lines of each of the bills among the multiple target lines according to the boundary matrix.

7. The method for identifying the number of bills in the image according to claim 6, wherein the step of merging the similar lines in the line pattern to obtain the multiple initial merged lines comprises:
    acquiring long lines from the line pattern, wherein the long line is a line whose length exceeds a first preset threshold;
    acquiring multiple groups of first type of lines from the long lines, wherein the first type of lines comprise at least two long lines adjacent successively, and angles between any two adjacent long lines are all less than a second preset threshold;
    for each group of the first type of lines, sequentially merging each of the long lines in the group of first type of lines to obtain the initial merged line.

8. The method for identifying the number of bills in the image according to claim 6, wherein the step of merging the similar lines among the multiple initial merged lines to obtain the target lines comprises:
    acquiring multiple groups of second type of lines from the multiple initial merged lines, wherein the second type of lines comprise at least two initial merged lines adjacent successively, and angles between any two adjacent initial merged lines are all less than a third preset threshold;
    for each group of the second type of lines, sequentially merging each of the initial merged lines in the group of second type of lines to obtain the target line.

9. The method for identifying the number of bills in the image according to claim 8, wherein the boundary matrix is determined in the following manner: the multiple initial merged lines and unmerged lines among the long lines are re-illustrated, and position information of pixel points in all the re-illustrated lines is set to correspond to an entire image matrix, values of positions of pixel points of these lines in the image matrix are set as first values, and values of positions of pixel points other than these lines in the image matrix are set as second values, thereby forming the boundary matrix.

10. The method for identifying the number of bills in the image according to claim 6, wherein the step of determining the multiple boundary lines of each of the bills among the multiple target lines according to the boundary matrix comprises:
for each of the target lines, the target line is extended, and a line matrix is determined according to the extended target line, the line matrix is compared with the boundary matrix, and a number of pixel points belonging to the boundary matrix on the extended target line is calculated to serve as a score of the target line, wherein the line matrix is the same size as the boundary matrix;
wherein the multiple boundary lines among the multiple target lines are determined according to the score of each of the target lines.

11. The method for identifying the number of bills in the image according to claim 10, wherein the line matrix is determined in the following manner: the extended target line is re-illustrated, position information of the pixel points in the re-illustrated line is set to correspond to the entire image matrix, and values of positions of pixel points of the lines in the image matrix are set as first values, and values of positions of pixel points other than the lines in the image matrix are set as second values, thereby forming the line matrix.

12. An electronic apparatus, comprising: a processor, a communication interface, a memory, and a communication bus, wherein the processor, the communication interface, and the memory complete communication with each other through the communication bus;
the memory configured to store a computer program;
the processor configured to implement the method claimed in claim 1 when executing the computer program stored in the memory.

13. A method for identifying multiple bill areas in an image, the method comprises:
acquiring the image containing multiple bills;
identifying an approximate area of each bill in the image through a machine vision algorithm;
for each bill, processing the approximate area of the bill in the image to obtain a line pattern with a gray contour in the approximate area of the bill;
merging similar lines in the line pattern to obtain multiple initial merged lines, and determining a boundary matrix according to the multiple initial merged lines;
merging similar lines among the multiple initial merged lines to obtain target lines, wherein the target lines further comprise the initial merged lines that are not merged;
determining multiple reference boundary lines in the approximate area among the multiple target lines according to the boundary matrix; and
obtaining multiple intersection points of the multiple reference boundary lines, and using an internal area defined by the multiple intersection points and the multiple reference boundary lines as an actual area of the bill.

14. The method for identifying multiple bill areas in the image according to claim 13, wherein the step of merging the similar lines in the line pattern to obtain the multiple initial merged lines comprises:
acquiring long lines from the line pattern, wherein the long line is a line whose length exceeds a first preset threshold;
acquiring multiple groups of first type of lines from the long lines, wherein the first type of lines comprise at least two long lines adjacent successively, and angles between any two adjacent long lines are all less than a second preset threshold;
for each group of the first type of lines, sequentially merging each of the long lines in the group of first type of lines to obtain the initial merged line.

15. The method for identifying multiple bill areas in the image according to claim 14, wherein the boundary matrix is determined in the following manner: the multiple initial merged lines and unmerged lines among the long lines are re-illustrated, and position information of pixel points in all the re-illustrated lines is set to correspond to an entire image matrix, values of positions of pixel points of these lines in the image matrix are set as first values, and values of positions of pixel points other than these lines in the image matrix are set as second values, thereby forming the boundary matrix.

16. The method for identifying multiple bill areas in the image according to claim 13, wherein the step of merging the similar lines among the multiple initial merged lines to obtain the target lines comprises:
acquiring multiple groups of second type of lines from the multiple initial merged lines, wherein the second type of lines comprise at least two initial merged lines successively adjacent, and angles between any two adjacent initial merged lines are all less than a third preset threshold;
for each group of the second type of lines, sequentially merging each of the initial merged lines in the group of second type of lines to obtain the target line.

17. The method for identifying multiple bill areas in the image according to claim 13, wherein the step of determining the multiple reference boundary lines of each of the bills among the multiple target lines according to the boundary matrix comprises:
for each of the target lines, the target line is extended, and a line matrix is determined according to the extended target line, the line matrix is compared with the boundary matrix, and a number of pixel points belonging to the boundary matrix on the extended target line is calculated to serve as a score of the target line, wherein the line matrix is the same size as the boundary matrix;
wherein the multiple reference boundary lines among the multiple target lines are determined according to the score of each of the target lines.

18. The method for identifying multiple bill areas in the image according to claim 17, wherein the line matrix is determined in the following manner: the extended target line is re-illustrated, position information of the pixel points in the re-illustrated line is set to correspond to the entire image matrix, and values of positions of pixel points of the lines in the image matrix are set as first values, and values of positions of pixel points other than the lines in the image matrix are set as second values, thereby forming the line matrix.

19. The method for identifying multiple bill areas in the image according to claim 13, wherein after obtaining the multiple reference boundary lines in the approximate area, the method further comprising:

identifying the approximate area through a pre-trained boundary line area identification model to obtain multiple boundary line areas of the bill in the approximate area; wherein the boundary line area identification model is a neural network-based model;

for each of the boundary line areas, determining a target boundary line corresponding to the boundary line area among the multiple reference boundary lines;

determining an edge of the bill in the approximate area according to the determined multiple target boundary lines.

20. The method for identifying multiple bill areas in the image according to claim 19, wherein, for each of the boundary line areas, the step of determining the target boundary line corresponding to the boundary line area among the multiple reference boundary lines comprises:

calculating a slope of each of the reference boundary lines;

for each of the boundary line areas, transforming the boundary line area into multiple straight lines, calculating an average slope of the multiple straight lines, and determining whether, among the multiple reference boundary lines, there is a reference boundary line whose slope matches the average slope, if such reference boundary line exists, the reference boundary line is determined as the target boundary line corresponding to the boundary line area.

21. The method for identifying multiple bill areas in the image according to claim 20, wherein the method further comprises:

for each of the boundary line areas, if it is determined that, among the multiple reference boundary lines, there is no reference boundary line whose slope matches the average slope, for each of the straight lines obtained by transforming the boundary line area, a line matrix formed by the straight line is compared with the boundary matrix to calculate the number of pixel points belonging to the boundary matrix on the straight line, and the number of the pixel points serves as a score of the straight line; the straight line with the best score is determined as the target boundary line corresponding to the boundary line area, wherein the line matrix is the same size as the boundary matrix.

22. The method for identifying multiple bill areas in the image according to claim 19, wherein following determining the edge of the bill in the approximate area, the method further comprising:

obtaining multiple intersection points of the multiple target boundary lines, performing perspective transformation on an area defined by the multiple intersection points and the multiple target boundary lines to obtain a front view of the bill in the approximate area.

23. An electronic apparatus, comprising: a processor, a communication interface, a memory, and a communication bus, wherein the processor, the communication interface, and the memory complete communication with each other through the communication bus;

the memory configured to store a computer program;

the processor configured to implement the method claimed in claim 13 when executing the computer program stored in the memory.

* * * * *